(12) United States Patent
Theiss et al.

(10) Patent No.: US 11,353,040 B2
(45) Date of Patent: Jun. 7, 2022

(54) TURBOCHARGER ASSEMBLY

(71) Applicant: Garrett Transportation I Inc., Torrance, CA (US)

(72) Inventors: Nathan Edward Theiss, Torrance, CA (US); Shane Fong Jung, Torrance, CA (US); Juan Gabriel Guadiana Cerrillo, Mexicali (MX); Mrunal Sawant, Pune (IN); Colin Joseph Hussey, Torrance, CA (US)

(73) Assignee: Garrett Transportation I Inc., Torrance, CA (US)

( * ) Notice: Subject to any disclaimer, the term of this patent is extended or adjusted under 35 U.S.C. 154(b) by 168 days.

(21) Appl. No.: 16/805,743

(22) Filed: Feb. 29, 2020

(65) Prior Publication Data
US 2021/0270285 A1    Sep. 2, 2021

(51) Int. Cl.
*F04D 29/42* (2006.01)
*F04D 29/046* (2006.01)
*F04D 29/063* (2006.01)

(52) U.S. Cl.
CPC ....... *F04D 29/4206* (2013.01); *F04D 29/046* (2013.01); *F04D 29/063* (2013.01)

(58) Field of Classification Search
CPC .. F04D 29/4206; F04D 29/046; F04D 29/063; F01D 25/162; F01D 25/18; F16C 33/6659; F16C 27/0452; F16C 360/24; F02C 6/12
See application file for complete search history.

(56) References Cited

U.S. PATENT DOCUMENTS 3,811,741 A * 5/1974 McInerney ............. F16C 27/02
                                          384/291
6,220,829 B1 * 4/2001 Thompson ............ F01D 25/164
                                            417/407

(Continued)

FOREIGN PATENT DOCUMENTS

| EP | 1 895 164 A2 | 3/2008 |
|---|---|---|
| EP | 2 065 564 A2 | 6/2009 |

(Continued)

OTHER PUBLICATIONS

Haefeli Diamantwekzeugfabrik AG, External Grinding, Mar. 9, 2016 to Nov. 29, 2019 (28 pages).

(Continued)

*Primary Examiner* — Brian P Wolcott
(74) *Attorney, Agent, or Firm* — Brian J. Pangrle

(57) ABSTRACT

A turbocharger assembly can include a housing that includes a bore defined by a bore wall and a pin socket that forms an opening in the bore wall; a bearing that includes a pin opening defined by a pin opening surface; a pin, where the pin includes a longitudinal pin axis and a pin surface; a groove in the pin opening surface or the pin surface, where the groove includes an axial length; wherein, in a positioned state of bearing in the bore and the pin in the pin socket with part of the pin in the pin opening, a clearance exists between the bearing and the bore wall, where the groove is in fluid communication with the clearance to form a supply path for lubricant from the clearance to an interface between the pin surface and the pin opening surface.

20 Claims, 15 Drawing Sheets

(56) References Cited

U.S. PATENT DOCUMENTS

| | | | |
|---|---|---|---|
| 7,415,878 B2* | 8/2008 | Gutknecht | F04D 29/0563 73/455 |
| 7,753,591 B2* | 7/2010 | Petitjean | F16C 33/1065 384/397 |
| 8,118,570 B2* | 2/2012 | Meacham | F16C 19/184 417/407 |
| 8,449,199 B2* | 5/2013 | Barlog | F16C 19/184 384/512 |
| 9,856,744 B2* | 1/2018 | Heddy, III | F02B 39/00 |
| 10,151,344 B2* | 12/2018 | Noda | F16C 33/605 |
| 10,393,169 B2* | 8/2019 | Kleinschmidt | F01D 25/166 |
| 10,487,726 B2* | 11/2019 | Wood | F01D 25/125 |
| 10,724,433 B2* | 7/2020 | Klusacek | F02C 6/12 |
| 2007/0003175 A1 | 1/2007 | Petitjean et al. | |
| 2009/0136368 A1* | 5/2009 | Arnold | F01D 25/162 417/407 |
| 2010/0068053 A1* | 3/2010 | Mathieu | F01D 25/166 415/229 |
| 2012/0107112 A1 | 5/2012 | Barlog | |
| 2018/0179954 A1 | 6/2018 | Klusacek et al. | |
| 2019/0218934 A1* | 7/2019 | Naik | F01D 25/162 |
| 2021/0231029 A1* | 7/2021 | Shirakawa | F02B 39/14 |

FOREIGN PATENT DOCUMENTS

| | | | | |
|---|---|---|---|---|
| EP | 2 065 564 A3 | 5/2012 | | |
| EP | 1 895 164 A3 | 6/2016 | | |
| WO | WO-2020083434 A1 * | 4/2020 | | F16C 33/1045 |

OTHER PUBLICATIONS

Haefeli Diamantwekzeugfabrik AG, 14E1D pointed wheels for grinding profiles, Dec. 26, 2019 (5 pages).

Lamquin et al., Power Losses Identification on Turbocharger Hydrodynamic Bearing Systems: Test and Prediction, GT2009-59599, Proceedings of ASME Turbo Expo 2009: Power for Land, Sea and Air, GT2009, Jun. 8-12, 2009, Orlando, FL USA (11 pages).

Chawla, Noise, Vibration and Harshness, http://web.iitd.ac.in/~achawla/public_html/736/14-NVH-V2.pdf, Apr. 24, 2012 (71 pages).

EP Application No. 21150663.9-1004, Extended European Search Report (EESR), dated Jul. 7, 2021 (10 pages).

* cited by examiner

TURBOCHARGER ASSEMBLY

TECHNICAL FIELD

Subject matter disclosed herein relates generally to turbocharger components for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. An electric compressor can include one or more compressor wheels that are connected to a shaft or shafts that can be driven by an electric motor. As an example, a shaft that is attached to one or more bladed wheels may be supported by one or more bearings disposed in a bearing housing, which may form a center housing rotating assembly (CHRA). During operation of a turbocharger or an electric compressor, depending on factors such as size of various components, a shaft may be expected to rotate at speeds in excess of 200,000 rpm. To ensure proper rotordynamic performance, a rotating group should be well balanced, well supported and well lubricated over a wide range of conditions (e.g., operational, temperature, pressure, etc.).

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
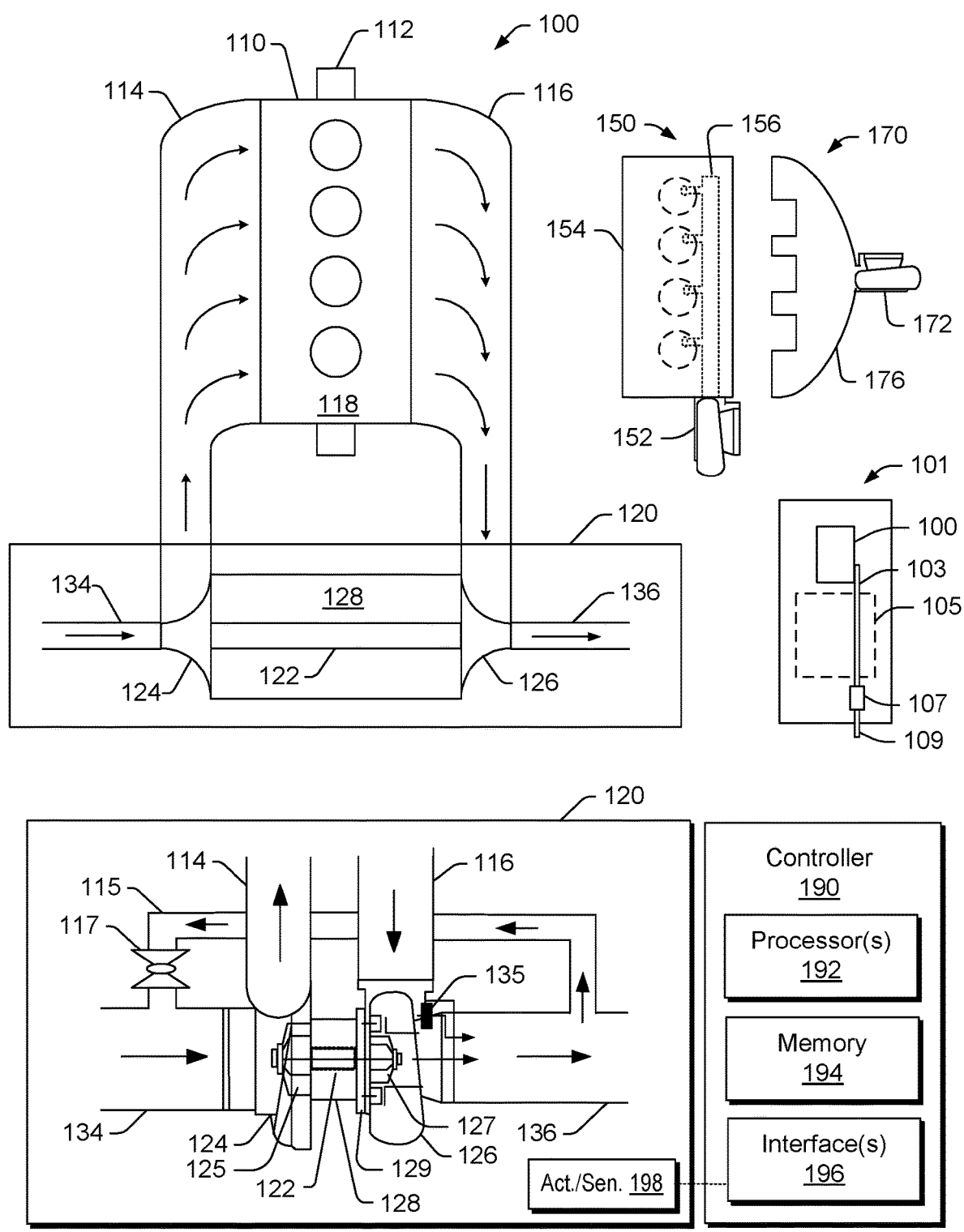
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2A:
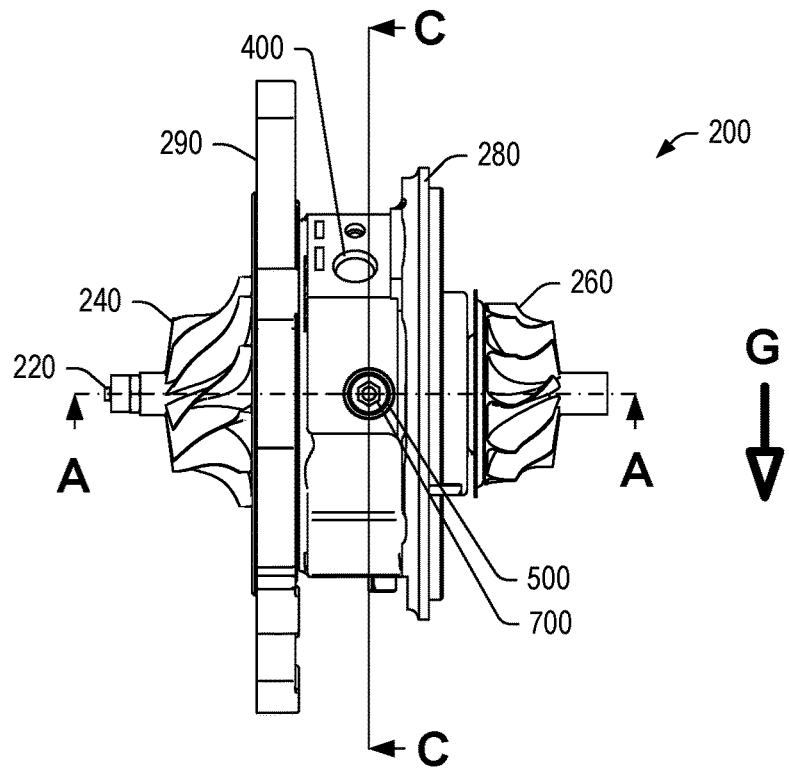
FIGS. 2A and 2B are a side view and an end view of an example of a turbocharger assembly.
Figure 2B:
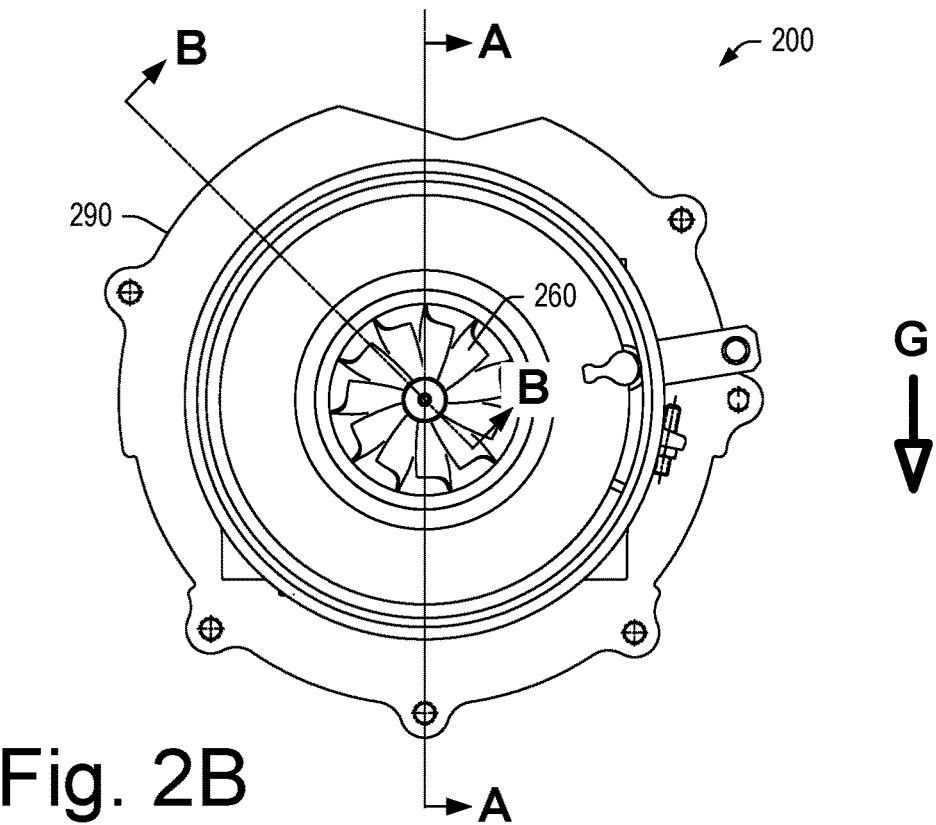

FIG. 2A shows a side view of an example of a turbocharger assembly 200 and FIG. 2B shows a turbine end view of the example of the turbocharger assembly 200.

As shown, the turbocharger assembly 200 includes a shaft 220, a compressor wheel 240, a turbine wheel 260, a center housing 280, and a compressor plate 290. As shown, the turbocharger assembly 200 also includes lubrication system features 400, a pin socket features 500 and a pin 700. In the example of FIGS. 2A and 2B, the turbocharger assembly 200 can be oriented with respect to gravity, for example, to facilitate flow of lubricant due in part to gravity.

Figure 3:
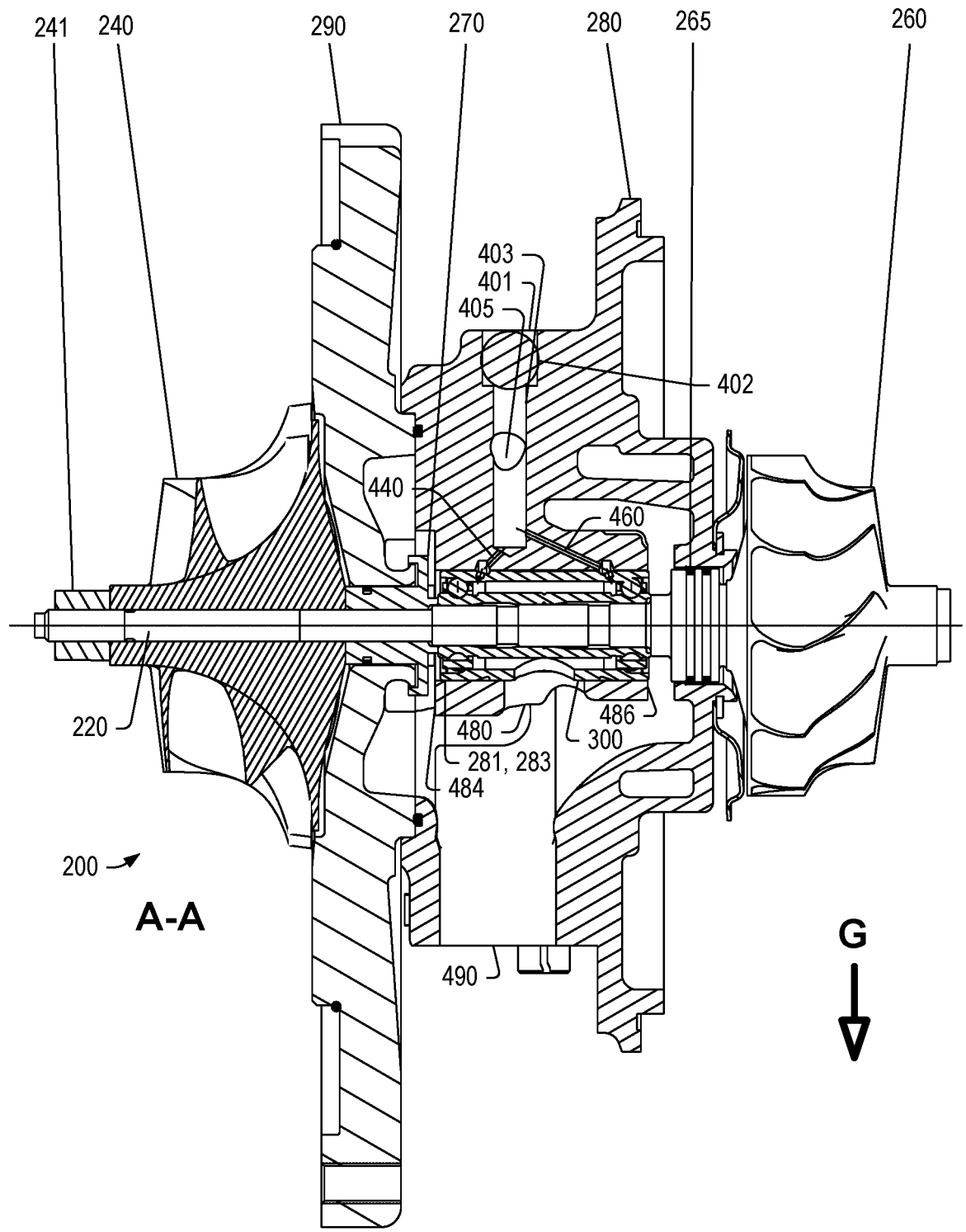
FIG. 3 is a cross-sectional view of the example turbocharger assembly of FIGS. 2A and 2B along a plane indicated by the line A-A.
Figure 4:
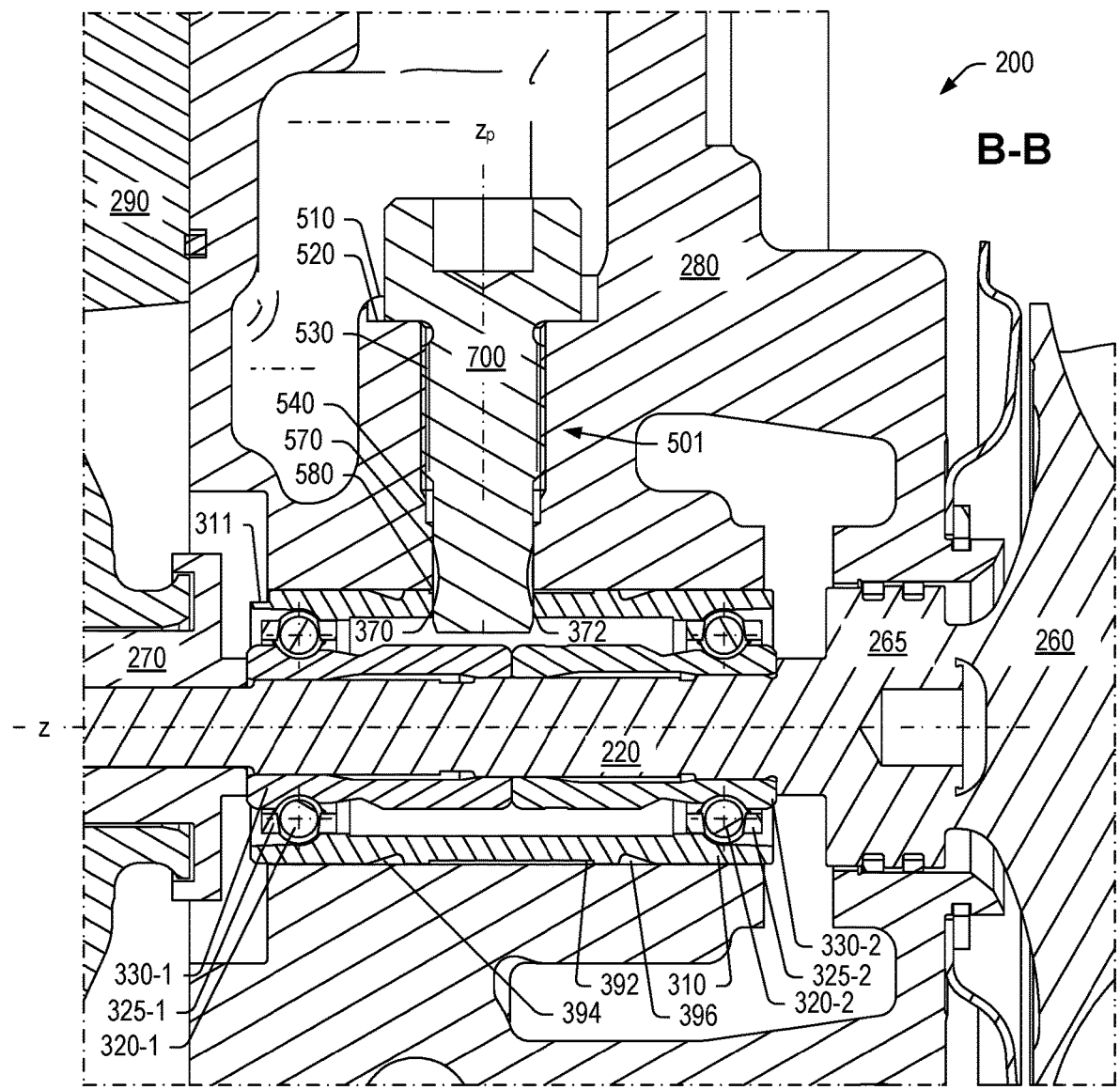
FIG. 4 is a cross-sectional view of the example turbocharger assembly of FIGS. 2A and 2B along a plane indicated by the line B-B.
Figure 5:
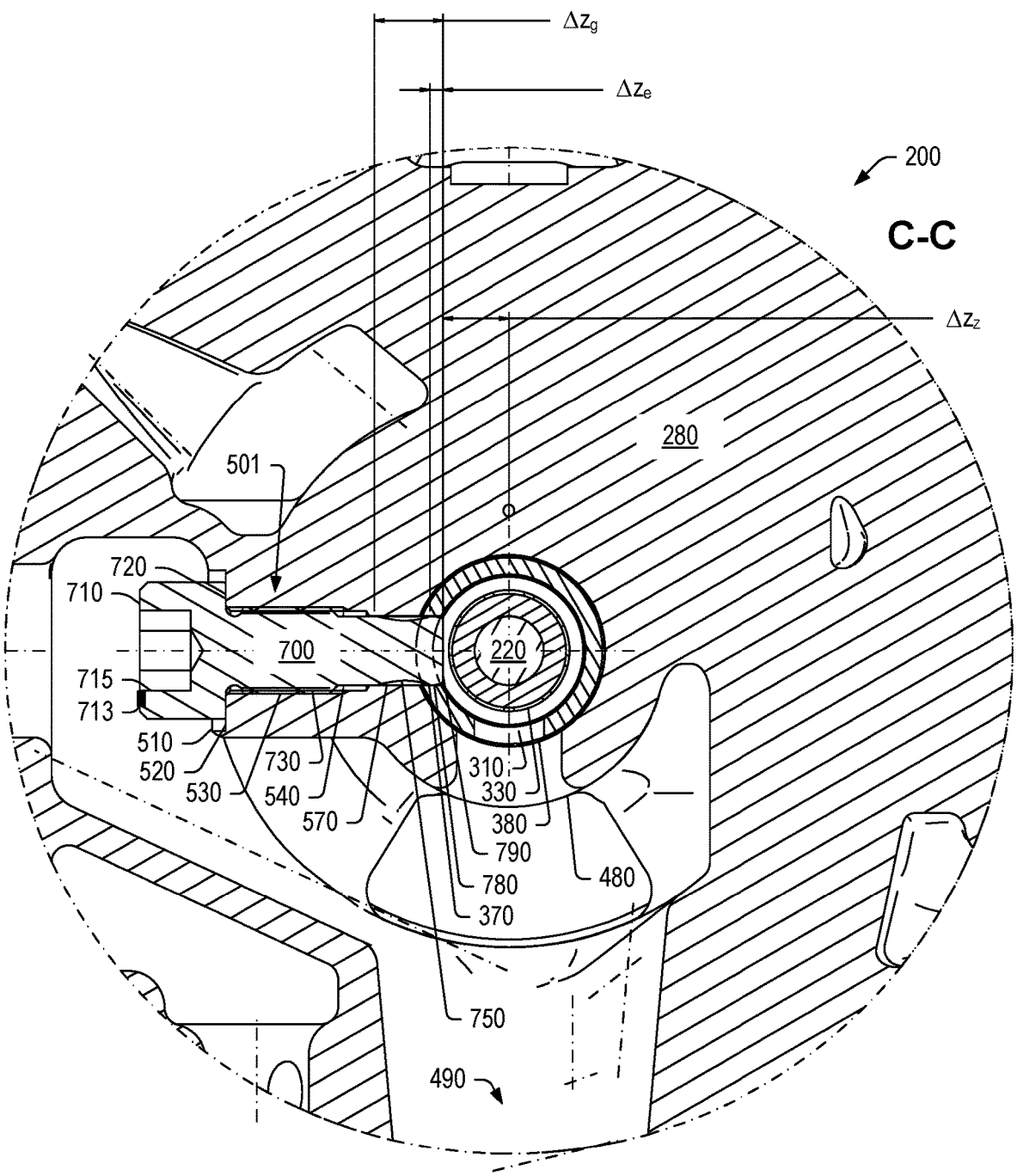
FIG. 5 is a cross-sectional view of the example turbocharger assembly of FIGS. 2A and 2B along a plane indicated by the line C-C.

FIG. 2A shows lines A-A and C-C while FIG. 2B shows lines A-A and B-B. FIG. 3 shows a cross-sectional view of the turbocharger 200 along the line A-A; FIG. 4 shows a cross-sectional view of the turbocharger 200 along the line B-B; and FIG. 5 shows a cross-sectional view of the turbocharger 200 along the line C-C.

In FIG. 3, the turbocharger assembly 200 is shown as including a nut 241 attached to the shaft 220 where the shaft 220 is part of a shaft and wheel assembly (SWA) that includes the turbine wheel 260. For example, the turbine wheel 260 can include a hub portion 265 that is a transition portion between the shaft 220 and the turbine wheel 260. As an example, the turbine wheel 260 can be welded or otherwise attached to the shaft 220 where various components are positioned along the shaft 220 such that tightening of the nut 241 acts to mechanically compress the compressor wheel 240 and cause rotation of the shaft 220 to rotate the compressor wheel 240.

In the example of FIG. 3, to reduce flow of exhaust inwardly into the center housing 280, the hub portion 265 of the SWA can include one or more seal elements such as, for example, piston rings that are disposed between the hub portion 265 and a bore wall of a turbine side bore of the center housing 280. To reduce flow of air inwardly into the center housing 280, a thrust collar 270 (e.g., optionally with a lubricant slinger, etc.) can be disposed in a bore of the compressor plate 290 where one or more seal elements may be positioned between the thrust collar 270 and a bore wall of the bore of the compressor plate 290.

In the example of FIG. 3, the turbocharger assembly 200 includes a bearing assembly 300 that is disposed at least in part in a bore 281 defined by a bore wall 283 of the center housing 280. As shown, the shaft 220 is rotatably supported by the bearing assembly 300 such that rotation of the turbine wheel 260 (e.g., via flow of exhaust) can drive rotation of the compressor wheel 240.

The bearing assembly 300 is shown as being a rolling element bearing assembly (REB assembly) that can be lubricated via flow of lubrication via the lubrication system features 400. In the example of FIG. 3, the lubrication system features 400 include an opening 401 to a bore 403 in the center housing 280 that is in fluid communication with another opening 405, which can be from an intersecting bore in the center housing 280. As shown, the opening 401 can receive a plug 402 to seal the bore 403 (e.g., a seal element such as a ball, etc.) with respect to the opening 401 such that the bore 403 is supplied with lubricant via the opening 405. As shown, the lubrication system features 400 include lubricant passages 440 and 460 where the lubricant passage 440 directs lubricant from the bore 403 toward the compressor side of the turbocharger assembly 200 and where the lubricant passage 460 directs lubricant from the bore 403 toward the turbine side of the turbocharger assembly 200. In such an example, the lubricant passages 440 and 460 are supplied by a common bore (e.g., the bore 403).

In the example of FIG. 3, the bearing assembly 300 can include lubricant jets that can direct lubricant to rolling elements such as, for example, ball bearings, etc. Lubricant can flow from the bearing assembly 300 and the bore 281 via various passages such as a passage 480 in fluid communication with the bore 281, a compressor side passage 484 and a turbine side passage 486 where lubricant can flow from such passages to a common lubricant outlet 490 of the center housing 280. As an example, an internal combustion engine can include a lubricant pump (e.g., an oil pump, etc.) that can supply via a conduit lubricant to the turbocharger assembly 200 under pressure such that pressurized lubricant is received in the bore 403. As the lubricant outlet 490 can be at a lower pressure than that of supplied lubricant, the lubricant system features 400 can provide for pressure-driven flow of lubricant. When supply pressure drops, for example, due to shutting down a lubricant pump, some remaining amount of lubricant may drain under flow of gravity, which may collect at or flow out via the lubricant outlet 490. In such an example, as lubricant drains, one or more lubricant films between the bearing assembly 300 and the bore 281 of the center housing 280 can thin such that the bearing assembly 300 may come to rest on the bore wall 283; noting that the bearing assembly 300 can carry the weight of various components such as the compressor wheel 240 and the turbine wheel 260 (e.g., and the thrust collar 270, etc.). When a lubricant pump resumes operation, pressurized flow of lubricant via the lubricant system features 400 can cause lubricant films to form or thicken, as well as lubricant to flow to lubricant rolling elements of the bearing assembly 300.

Lubricant can reduce friction between components, form lubricant films and transfer heat energy away from the turbocharger assembly 200. However, in various instances, components can contact, which may result in noise, wear, vibration, etc. For example, where two components contact, the contacting force can result in noise, vibration and harshness (NVH).

NVH can be utilized to characterize vehicles, particularly cars and trucks. While noise and vibration may be measurable, harshness tends to be a subjective quality (e.g., measured via surveys, analytical tools that can provide results reflecting human subjective impressions, etc.), as may be part of the field of psychoacoustics. In various instances, engine-related noise (e.g., turbocharger noise) can present in an interior space (e.g., a cabin) of a vehicle, which may be annoying to one or more occupants of the vehicle.

In FIG. 4, the turbocharger assembly 200 includes the pin 700 positioned with respect to the pin socket features 500. In the example of FIG. 4, the pin 700 can perform one or more functions. For example, the pin 700 can limit movement of at least a portion of the bearing assembly 300. However, as mentioned, if two components contact each other, one or more NVH issues may arise. In the example of FIG. 4, the pin 700 is shown as including features that can mitigate one or more NVH issues. For example, the pin 700 can provide for lubricant flow and/or lubricant film formation that can reduce incidence of one or more NVH issues, which can include one or more of rotational speed related issues, lubricant pressure related issues, thrust related issues, etc.

In the example of FIG. 4, the bearing assembly 300 is shown as including an outer race 310, an inner race 330 and rolling elements 320 that are disposed at least in part between the outer race 310 and the inner race 330, for example, using a bearing retainer 325. In the example of FIG. 4, the inner race 330 may be optional, for example, consider a shaft that directly includes raceways for rolling elements; whereas, in FIG. 4, the inner race 330 is fit to the shaft 220 where the inner race 330 includes raceways for the rolling elements 325. Also, in the example of FIG. 4, the bearing assembly 330 includes a compressor side set of rolling elements 320-1 with a corresponding bearing retainer 325-1 and a turbine side set of rolling elements 325-2 with a corresponding bearing retainer 325-2 and a multi-piece inner race 330, which can include a compressor side inner race 330-1 and a turbine side inner race 330-2.

As mentioned, the outer race 310 can include lubricant jets such as, for example, one or more compressor side lubricant jets and one or more turbine side lubricant jets, which can be supplied with lubricant via the passage 440 and the passage 460, respectively, where the lubricant jets direct lubricant to the rolling elements 320-1 and the rolling elements 320-2, respectively.

In the example of FIG. 4, some lubricant regions are shown, including a lubricant film region 392, a compressor side lubricant well region 394 and a turbine side lubricant well region 396. As an example, the passage 440 can supply lubricant to the compressor side lubricant well region 394, which can be in fluid communication with one or more compressor side lubricant jets of the outer race 310, and the passage 460 can supply lubricant to the turbine side lubricant well region 396, which can be in fluid communication with one or more turbine side lubricant jets of the outer race. As to the lubricant film region 392, it may receive lubricant via one or more routes, which can be via the compressor side lubricant well region 394 and/or via the turbine side lubricant well region 396. As shown, the lubricant well regions 392, 394 and 396 span axial lengths and span azimuthal angles with respect to a rotational axis of the inner race 330. For example, each of the lubricant regions 392, 394 and 396 can span 360 degrees.

In the example of FIG. 4, the maximum outer diameter of the outer race 310 as received in the bore 281 of the center housing 280 can be slightly less than the inner diameter of the bore wall 283 of the bore 281 of the center housing 280 such that one or more clearances are formed where lubricant can exist therein. For example, most of the outer surface of the outer race 310 can be coated with lubricant and most of the surface of the bore wall 283 can be coated with lubricant. In such an example, one or more lubricant regions can form one or more lubricant squeeze films, which can be sized to provide properties that aim to reduce NVH, etc. As an example, a lubricant squeeze film can be referred to as a squeeze film damper (SFD).

As an example, in a rolling element bearing assembly (REB assembly), a series of rolling elements can be placed between an inner race and an outer race where the inner race can be press fitted on a shaft and where the outer race is limited in its rotational movement by an anti-rotation pin. In such an example, a lubricant film that forms between the outer race and a bore wall of a bore of a center housing can be a squeeze film damper (SFD).

In another type of bearing system, referred to as a journal bearing system, a journal bearing (or journal bearings) can be utilized without rolling elements; noting that a hybrid approach may utilized a journal bearing and a REB assembly. As to a fully floating rotating journal bearing, it can utilize two hydrodynamic lubricant films disposed in series where one film is an inner film (between the shaft and journal bearing) and the other film is an outer film (between the journal bearing and center housing). As to a semi-floating journal bearing, it can include a hydrodynamic inner lubricant film and a squeeze film damper (SFD) (outer oil film, between the journal bearing and the center housing). While various examples mention use of a REB assembly, as an example, a semi-floating journal bearing may be utilized where, for example, the journal bearing includes an opening that can receive a pin such as, for example, the pin 700. While various examples refer to a center housing, as an example, a component other than a center housing may be utilized to form a bore such as the bore 281 (e.g., consider a bearing housing, which may be a cartridge that can be received in a center housing, etc.).

As to the pin socket features 500, FIG. 4 shows a pin socket or pin bore 501, an opening 510, an axial face 520 (e.g., a stop surface), a mating region 530 (e.g., for threading via threads, for interference fitting, etc.), a transition region 540, and a lubricant well region 570 that can define one or more lubricant wells with respect to the pin 700, for example, where the pin 700 is received at least in part in the lubricant well region 570. In the example of FIG. 4, the pin socket 501 can be formed as a cross-bore that intersects the bore 281 of the center housing 280.

In the example of FIG. 5, an opening 580 in the bore wall 283 of the bore 281 of the center housing 280 and the pin socket 501 can be defined by a perimeter formed by the intersection of two cylinders. The curves of intersection of two cylinders of radii "a" and "b" are given by the parametric equations in a Cartesian coordinate system (x, y, z):

$$x(t) = b \cos(t)$$

$$y(t) = b \sin(t)$$

$$z(t) = +/- (a^2 - b^2 \sin^2(t))^{0.5}$$

Figure 10:
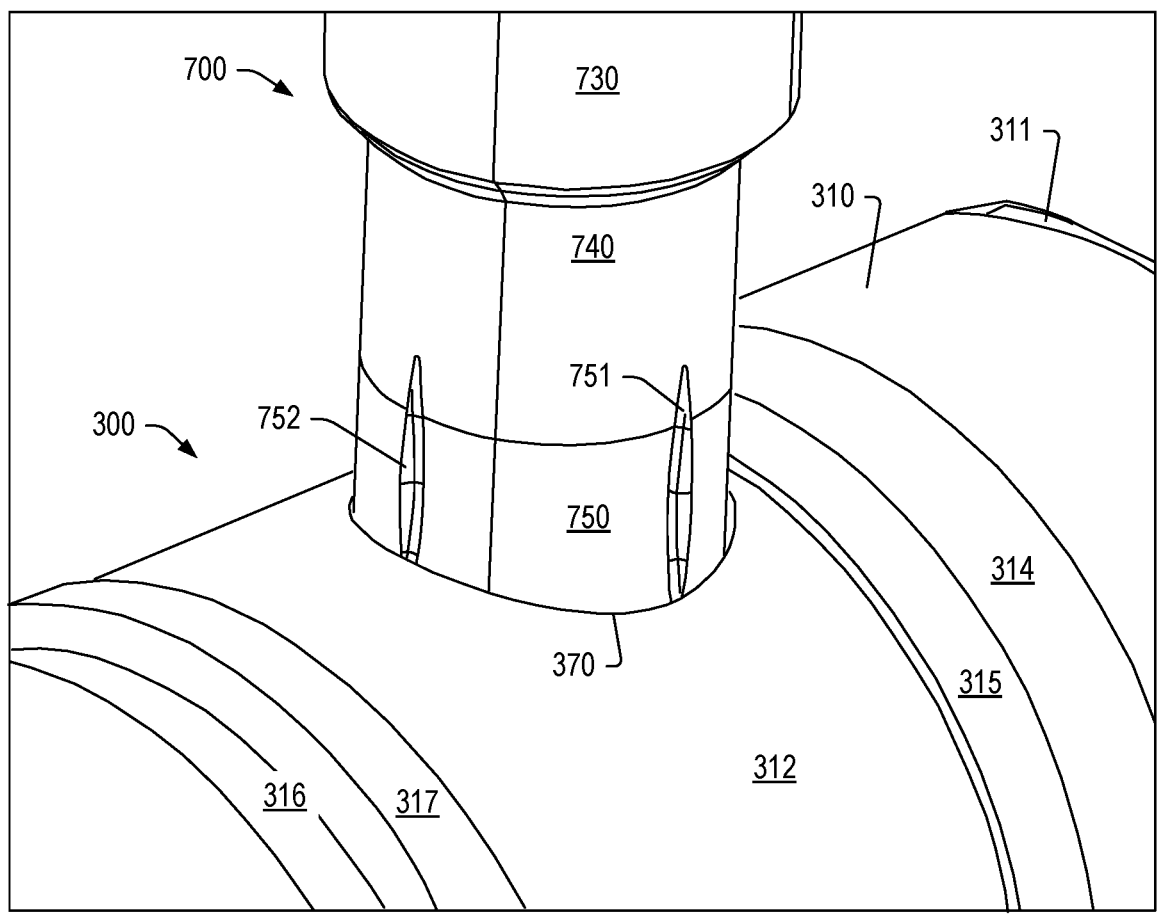
FIG. 10 is a perspective view of an example of a pin and an example of a bearing assembly.
Figure 11A:
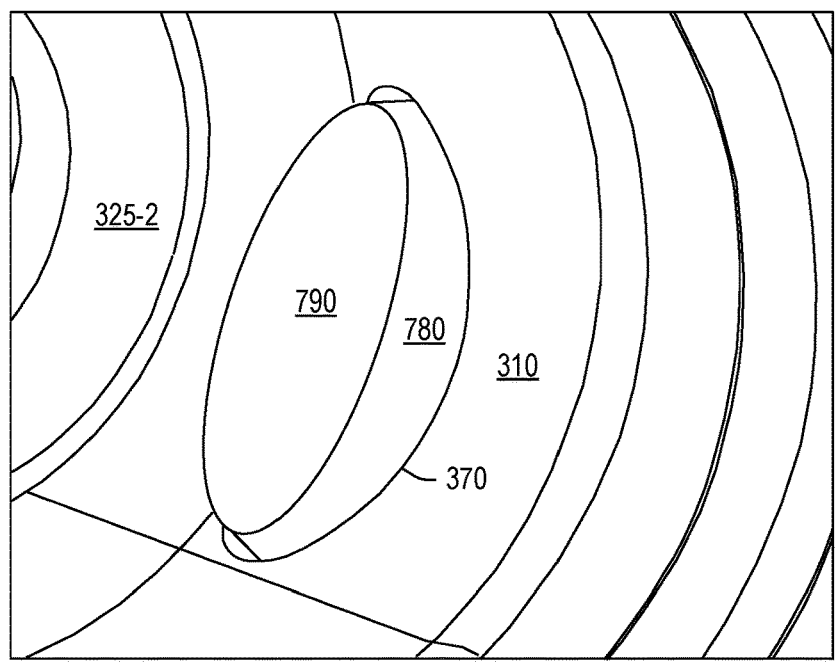
FIGS. 11A and 11B are perspective views of an example of a turbocharger assembly with an outer race (FIG. 11A) and without an outer race (FIG. 11B)
Figure 11B:
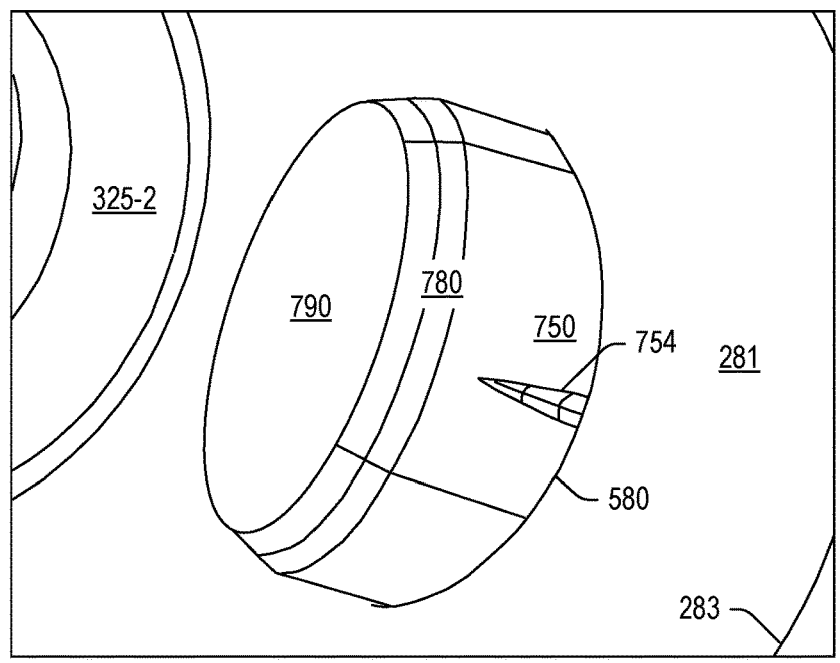

In such an example, a bore of a housing can be of a radius "a" and a portion of a pin socket of the housing can be of a radius "b" where such "cylinders" may intersect at right angles (see also, e.g., FIG. 10, FIG. 11A and FIG. 11B).

In the example of FIG. 4, the pin 700 is shown as being at least in part received in an opening 370 of the outer race 310 of the bearing assembly 300 (e.g., consider intersecting "cylinders"). As the pin 700 is securely fit in the center housing 280 via the at least some of the pin socket features 500 (e.g., features of the mating region 530, etc.), the pin 700 can be stationary. In contrast, the outer race 310 of the bearing assembly 300 can be semi-floating, for example, via one or more lubricant films (e.g., consider the lubricant regions 392, 394 and 396, etc.), while the pin 700, as secured, limits rotational movement of the outer race 310.

As mentioned, where components contact, one or more NVH issues may arise. For example, consider the outer race 310 rotating in the bore 281 of the center housing 280 such that a wall 372 of the outer race 310 that defines the opening 370 contacts the pin 700. In such an example, contact between the wall 372 (e.g., a wall surface) and the pin 700 (e.g., an outer surface of the pin 700) can occur with force sufficient to generate a noise (e.g., kinetic energy being transformed into acoustic energy).

Acoustic intensity, I, can have units of energy per unit area per unit time and acoustic energy density, w=I/c, can have units of energy per unit volume.

As an example, NVH can be periodic and/or random. For example, periodic NVH can be driven by a rotational speed (e.g., RPM) or one or more other periodic phenomena; whereas, random NVH can be driven by one or more random processes, which may be random or, for example, random in occurrence and periodic during occurrence, etc.

As an example, NVH can be caused by unbalance of one or more components. For example, consider a rotating assembly such as a center housing rotating assembly (CHRA) where the turbocharger assembly 200 can be a CHRA. In such an example, some amount of unbalance can exist for one or more components such as, for example, one or more of the compressor wheel 240, the turbine wheel 260, the thrust collar 270, the inner race 330, etc. As an example, unbalance may manifest in a manner that depends on one or more operational conditions such as, for example, rotational speed of a shaft, which may be a turbocharger shaft, a crankshaft of an internal combustion engine, etc. As an example, where lubricant flow is driven by a lubricant pump where the speed of the lubricant pump is variable (e.g., depending on crankshaft speed, etc.), NVH may depend on how the lubricant pump operates. As an example, at a low engine RPM (crankshaft RPM), a crankshaft driven lubricant pump may provide less pressure than at a higher engine RPM and, in such an example, the exhaust energy of the engine may relate to rotational speed of a turbine wheel as part of a SWA supported by a bearing (e.g., REB assembly, journal bearing, etc.).

As mentioned, the outer race 310 of the bearing assembly 300 can include the opening 370, which can receive a portion of the pin 700. To reduce risk of, occurrence of (e.g., frequency, etc.) and/or magnitude of one or more NSV issues, the pin 700 can include grooves that are positioned to deliver some amount of lubricant from a clearance region between the outer race 310 and the bore wall 283 of the center housing 280 to an interface between the pin 700 and the wall 372 of the outer race 310 that defines the opening 370. In such an example, the lubricant at the interface can provide for energy damping such that kinematics are favorably altered. For example, consider damping vibration, which can include vibration that would get transmitted from the outer race 310 to the center housing 280 via the pin 700.

As mentioned, the pin 700 may provide for one or more of anti-rotation (e.g., rotation limiting) and anti-axial translation (e.g., translation limiting). Where one type of motion causes undesirable behavior, one or more grooves may be provided that mitigate that undesirable behavior. For example, consider clockwise rotation where a groove is positioned to damp contact from such clockwise rotation, which may be dependent on turbocharger behavior, including intended direction of rotation of a turbine wheel responsive to flow of exhaust. As another example, consider counter-clockwise rotation where a groove is positioned to damp contact from such counter-clockwise rotation, which may be dependent on turbocharger behavior, including intended direction of rotation of a turbine wheel responsive to flow of exhaust. As yet another example, consider a groove is positioned to damp contact from axial translation toward a compressor side of a turbocharger, which may be dependent on turbocharger behavior, including intended direction of rotation of a turbine wheel responsive to flow of exhaust. As yet another example, consider a groove is positioned to damp contact from axial translation toward a turbine side of a turbocharger, which may be dependent on turbocharger behavior, including intended direction of rotation of a turbine wheel responsive to flow of exhaust. As an example, a pin can include one or more grooves where each of the grooves may be to address one or more particular types of motion. As an example, a pin can include four grooves that may be sufficient to address the foregoing four types of contact. As an example, shape and/or size and/or number of grooves may differ for different types of motion (e.g., different types of contact).

As an example, a pin may include a symmetric arrangement of grooves and/or an asymmetric arrangement of grooves. As to a symmetric arrangement, consider four grooves at 0, 90, 180 and 270 degrees about an axis of a pin. In such an example, the pin may be positioned into an opening of an outer race (e.g., or journal) where two of the grooves are aligned substantially axially along an axis parallel to an axis of rotation of a shaft and the other two of the grooves are aligned along a cross-axis, parallel and orthogonal to the axis of rotation of the shaft. To facilitate alignment, a pin can include a marker, markers, etc., which may be at a top of the pin (e.g., a head portion of the pin).

For example, a pin can include an indicator (e.g., a mark) that is to be substantially aligned in a direction toward a compressor side or a turbine side. Where a pin includes symmetry of grooves, the indicator may be suitable for substantial alignment toward a compressor side or a turbine side. While compressor side and turbine side are mentioned, referring to FIG. 2A, the center housing 280 can include one or more features to facilitate positioning of a pin for alignment of the pin about an axis of the pin with respect to an outer race (e.g., or journal). For example, consider positioning a pin with a marker pointing down in FIG. 2A (e.g., in the direction of gravity) or with a marker pointing up in FIG. 2A. As an example, one or more fiducials (e.g., fiducial markers) can be utilized to facilitate positioning of a pin in a center housing such that one or more features of the pin (e.g., one or more grooves) are sufficiently aligned to mitigate one or more types of NVH issues.

FIG. 5 shows a cross-sectional, cut-away view of a portion of the turbocharger assembly 200 where the pin 700 includes a head 710, an optional marker 713, an optional drive feature 715, an axial face 720 (e.g., a stop surface), a mating region 730, a transition region 740, a groove portion 750 with one or more grooves that span an axial length along the pin 700, as may be indicated by the dimension $\Delta z_g$, an end portion 780 and an end surface 790. In the example of FIG. 5, two grooves are visible, noting that one or more other grooves may be presented, where the two grooves are of approximately equal dimensions.

As explained, the center housing 280 can include the pin socket features 500 that can facilitate acceptable positioning of the pin 700 in the center housing 280. For example, the axial face 520 can be utilized to axially locate the pin 700 via the axial face 720 of the pin 700 such that an end 790 of the pin 700 extends a desired depth into the bore 281 of the center housing 280 and/or the outer race 310 of the bearing assembly 300. As shown, the depth may be measured, for example, using a longitudinal axis of the bore 281, as indicated by the dimension $\Delta z_z$. The example of FIG. 5 shows another dimension which is an axial dimension, $\Delta z_e$, of the end portion 780 of the pin 700 along the axis of the pin 700. As shown in the example of FIG. 5, each of the two grooves extends into the opening 370 of the outer race 310 of the bearing assembly 300 and the end surface 790 of the pin 700 does not contact the inner race 330 of the bearing assembly 300 (e.g., a clearance exists between the end surface 790 of the pin 700 and an outer surface of the inner race 330).

In the example of FIG. 5, the pin 700 can include one or more types of features along at least a portion of the mating region 730 that can mate with one or more types of features along at least a portion of the mating region 530 of the pin socket 501. Features may include, for example, one or more pilots, one or more threads, one or more interference fit surfaces, etc. As an example, the pin 700 can be threaded along at least a portion of the mating region 730 with threads that mate with corresponding threads along at least a portion of the mating region 530. As an example, the pin 700 may be threadless and the pin socket 501 may be threadless such that the pin 700 is fit via an interference fit via interference surfaces along at least a portion of the mating region 730 and along at least a portion of the mating region 530. In either example, where the pin 700 is provided with the marker 713, the marker 713 may be oriented such that one or more grooves of the pin 700 are suitably oriented with respect to the bore 281 (e.g., with respect to a bore axis, etc.).

Figure 6:
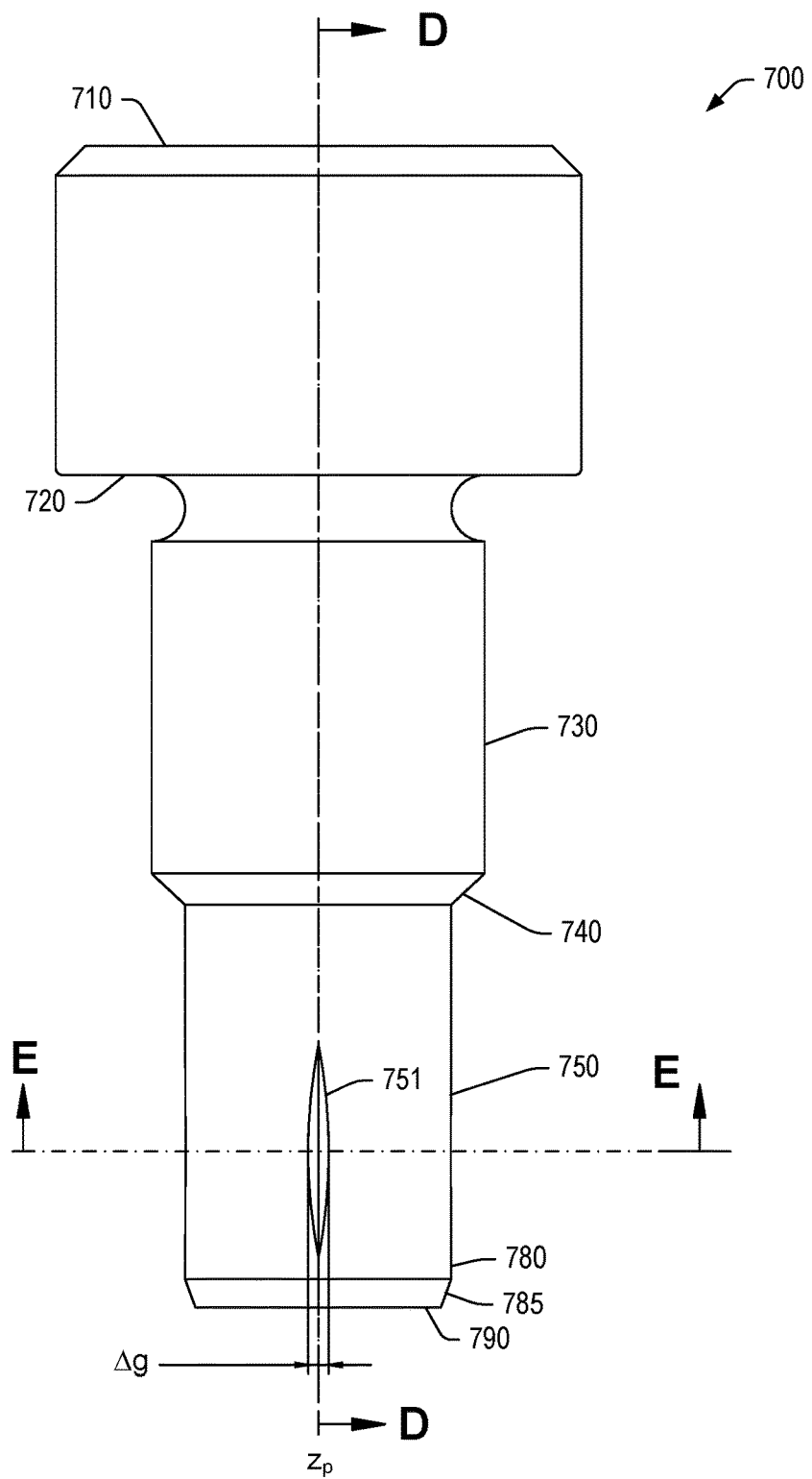
FIG. 6 is a side view of an example of a pin.

FIG. 6 shows a side view of an example of the pin 700, which shows the head 710, the axial face 720, the mating region 730, a transition region 740, the groove portion 750, the end portion 780 and the end surface 790, where a chamfer 785 (e.g., annular, conical surface, etc.) can be present as a transition from a diameter of the end portion 780 to a smaller diameter of the end surface 790. In FIG. 6, the pin 700 is shown with a groove 751, which can be defined by an axial length along the pin axis and a cross-dimension, shown as $\Delta g$. The cross-dimension may be measured using a straight distance, an arc distance, and/or an angle. As shown, the cross-dimension is shown as being a maximum cross-dimension, which is approximately centered along the axial length of the groove 751. In the example of FIG. 6, the groove 751 is shown as being substantially symmetric along a longitudinal axis, where the groove 751 may be formed into the pin 700 via one or more types of techniques. As an example, the groove 751 may be formed via a machining technique, for example, using a grinding wheel with a V-shaped edge profile (see, e.g., FIGS. 13A and 13B, etc.).

Figure 7:
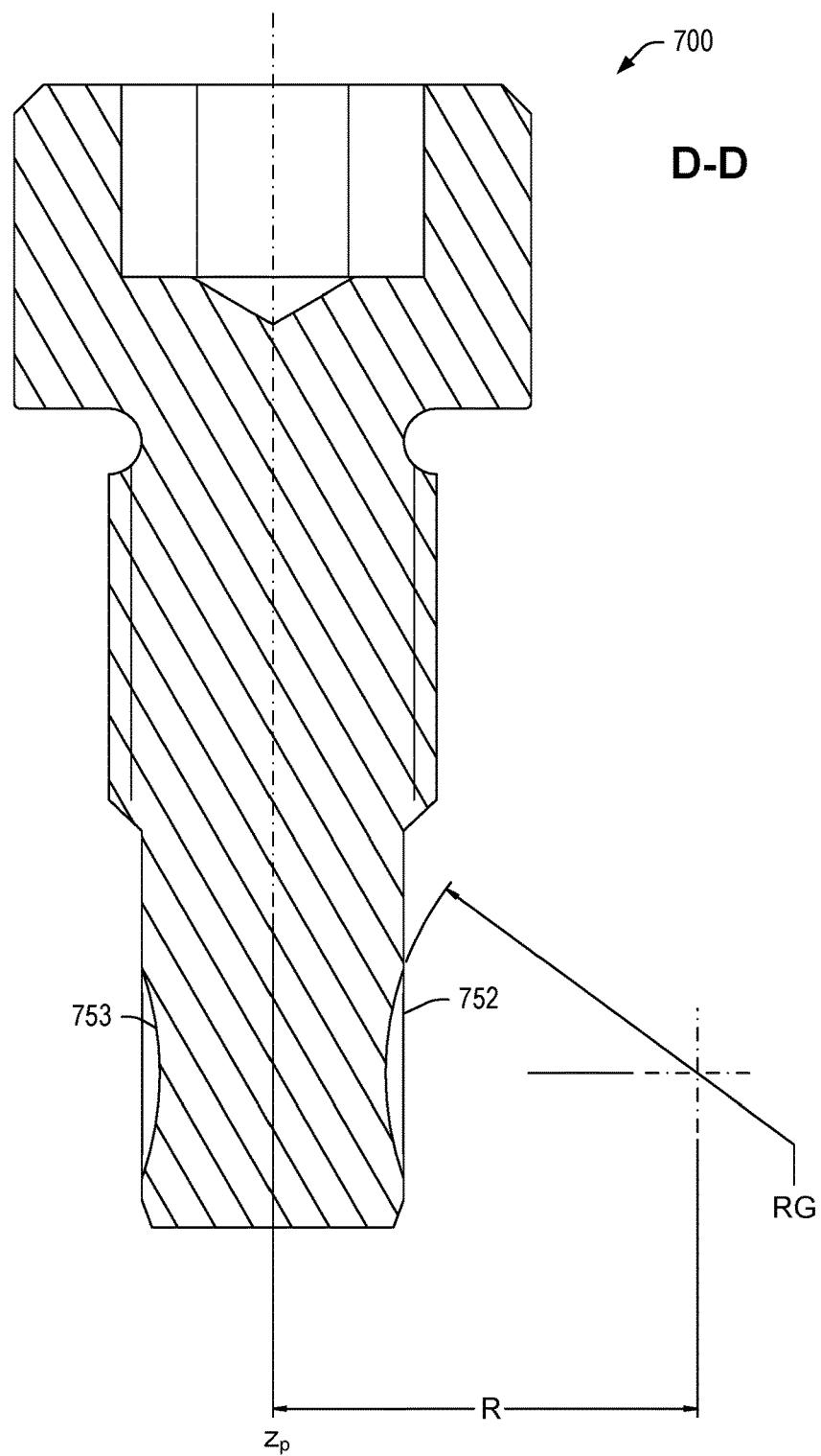
FIG. 7 is a cross-sectional view of the example pin of FIG. 6 along a plane indicated by the line D-D.

FIG. 7 shows a cross-sectional view of the pin 700 along the line D-D as illustrated in FIG. 6. In the example of FIG. 7, grooves 752 and 753 are shown, which can be spaced at approximately 90 degrees clockwise and counter-clockwise, respectively, from the groove 751 of the example of FIG. 6. As shown, the groove 752 may be defined by a radius RG as measured a distance R from a pin axis $z_p$.

Figure 8A:
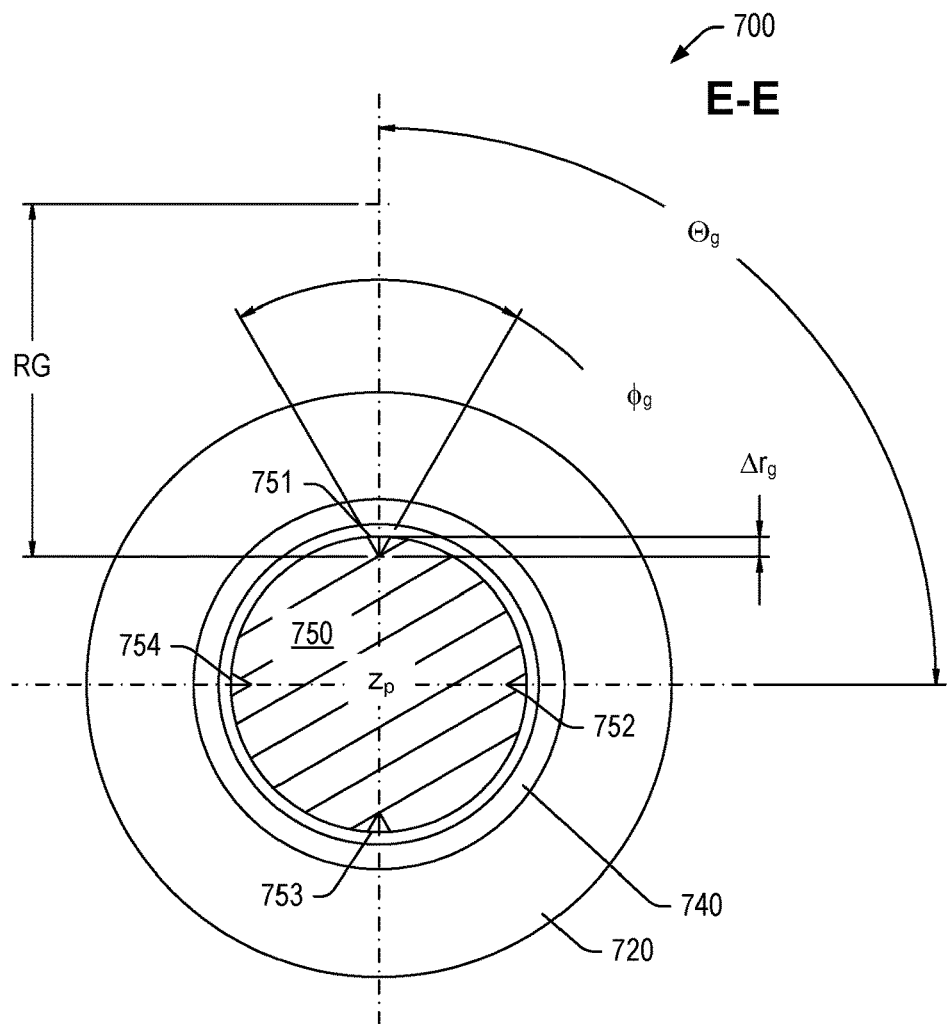
FIGS. 8A and 8B are a cross-sectional view of the example pin of FIG. 6 along a plane indicated by the line E-E and a corresponding cross-sectional view including an example of an outer race of a bearing assembly.

FIG. 8A shows a cross-sectional view of the pin 700 along the line E-E as illustrated in FIG. 6. In the example of FIG. 6, grooves 751, 752, 753 and 754 are shown, which are arranged at approximately 0, 90, 180 and 270 degrees about the pin axis $z_p$ (e.g., spacing of $\Theta_g$=90 degrees). As shown in the example of FIG. 8A, the groove 751 can be defined using the dimension RG, an angle $\phi_g$ and a radial depth $\Delta r_g$, as measured from a diameter of the pin 700 to the pin axis $z_p$.

Figure 8B:
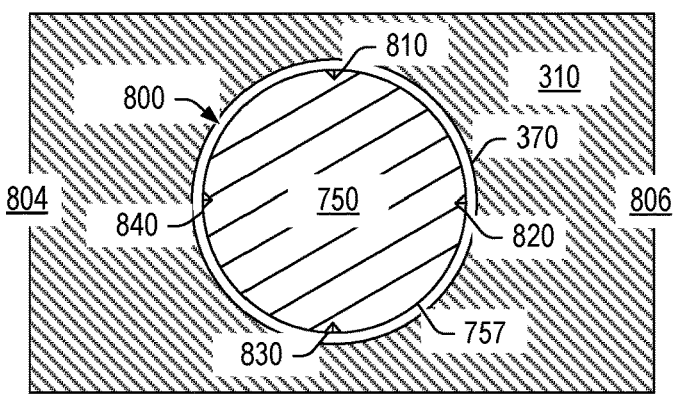

FIG. 8B shows the pin 700 in a cross-sectional view that is through a portion of the outer race 310 of the bearing assembly 300, which is at a lower axial position than the cross-sectional view of FIG. 8A, as can be discerned by the sizes of the grooves 751, 752, 753 and 754 (see, e.g., FIG. 5). As shown in FIGS. 8A and 8B, a maximum radial depth ($\Delta r_g$) of a groove can be at an axial position along the pin axis $z_p$ that, when the pin 700 is positioned, is within the pin socket 501 and where a portion of the groove extends axially along the pin axis $z_p$ past the pin socket 501 (e.g., out of the pin socket 501 and into the bore 281). In such an approach, a groove can be a reservoir with an opening that can be in fluid communication with lubricant of a film defined in a clearance between an outer surface of an outer race and an inner surface of a bore wall of a bore. In such an example, the dimensions of the groove, in combination with pin position with respect to a pin socket, can define a size of an opening relative to a reservoir volume where lubricant can flow into and out of the reservoir volume via the sized opening.

As an example, a groove reservoir and a reservoir opening may be sized with a priori knowledge of dynamics that may occur during operation of a turbocharger. For example, upon clockwise rotation of an outer race, lubricant pressure in the groove reservoir may decrease and/or lubricant volume in the groove reservoir may decrease (e.g., as lubricant may flow from the groove reservoir via the reservoir opening to another space) and, for example, upon counter-clockwise rotation of an outer race, lubricant pressure in the groove reservoir may increase and/or lubricant volume in the groove reservoir may increase (e.g., as lubricant may flow into the groove reservoir via the reservoir opening from another space). Such hydrodynamics can act to damp rotational movement (e.g., clockwise and/or counter-clockwise) of an outer race with respect to a pin that is received at least in part in an opening in the outer race. Such damping can help to reduce risk of one or more types of NVH, reduce occurrence of one or more types of NVH, and/or reduce magnitude (e.g., impact) of one or more types of NVH.

Referring again to FIG. 8B, a clearance region 800 is illustrated along with groove regions 810, 820, 830 and 840 where the regions 800, 810, 820, 830 and 840 can receive lubricant (e.g., fill with lubricant). FIG. 8B also shows the opening 370 of the outer race 310 (e.g., as defined by a surface of the outer race 310) and an outer surface 757 of the groove region 750 of the pin 700.

In the example of FIG. 8B, a turbine side 806 is shown along with a compressor side 804. In such an example, axial thrust can drive the outer race 310 toward the compressor side 804 or toward the turbine side 806, where the dynamics of such axial thrust and its direction can differ. As explained, the outer race 310 may rotate, either clockwise or counter-clockwise, where the dynamics can differ.

In the example of FIG. 8B, the regions 820 and 840 can provide for some amount of damping for axial thrust that causes at least translational movement of the outer race 310 (e.g., along an axis directed from the compressor side 804 to the turbine side 806) while the regions 810 and 830 can provide for some amount of damping for rotation (e.g., clockwise or counter-clockwise about the axis directed from the compressor side 804 to the turbine side 806). As mentioned, a pin can include one or more grooves where each groove may correspond to a particular type or types of movement that may give rise to one or more NVH issues. While the example of FIG. 8B shows the regions 810, 820, 830 and 840 numbering four in total and being spaced at approximately 90 degrees about the pin axis $z_p$, where an issue is determined to be for one of the aforementioned four types of movements, a pin may include a single groove or grooves arranged to address that one type of movement.

Figure 9A:
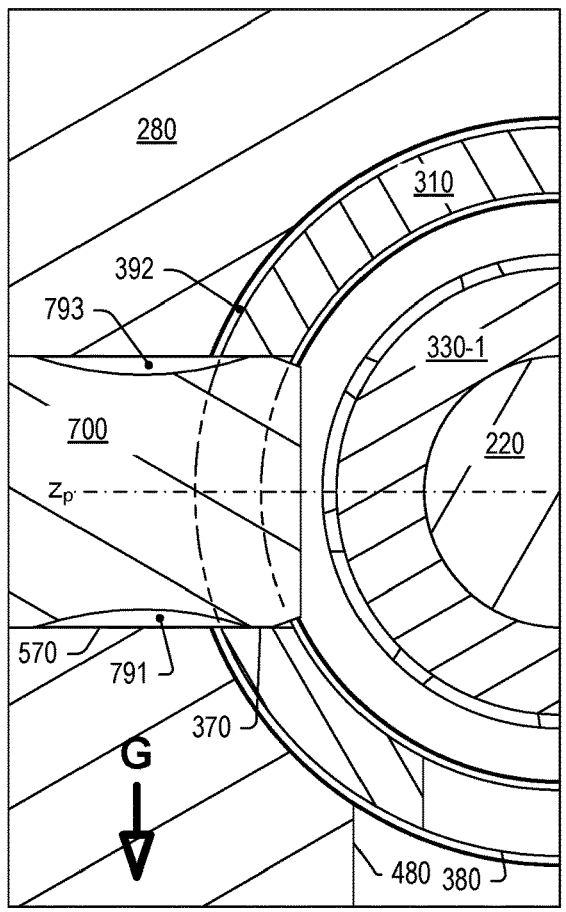
FIGS. 9A and 9B are enlarged views of portions of the view of FIG. 7 and the view of FIG. 8, respectively.
Figure 9B:
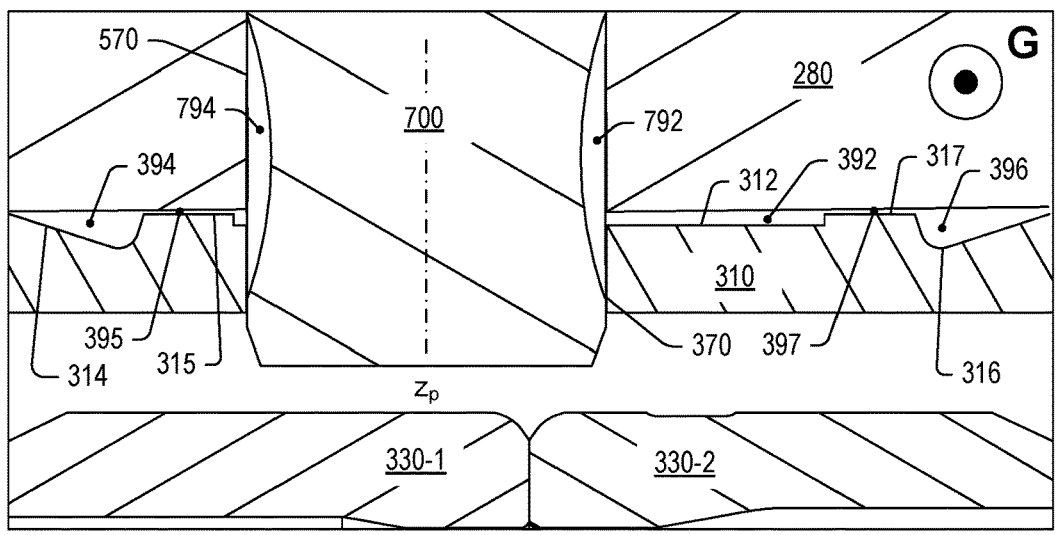

FIG. 9A shows an enlarged view of a portion of the cross-sectional view of FIG. 5 and FIG. 9B shows an enlarged view of a portion of the cross-sectional view of FIG. 6. The grooves 791, 792, 793 and 794 can provide space for lubricant and may form lubricant reservoirs that can supply lubricant to the lubricant film region 392 and/or receive lubricant from the lubricant film region 392.

As shown, in FIGS. 9A and 9B, due to the "intersecting cylinders" geometry, the grooves 791 and 793 do not extend as deeply into the opening 370 of the outer race 310 as do the grooves 792 and 794, all of which are in fluid communication with the lubricant film region 392. As an example, a pin can include grooves with different dimensions, shapes, positions, etc. For example, where it is desirable to have each groove extend a common depth into an opening of an outer race (e.g., or journal), the cross-axis grooves (see, e.g., the grooves 791 and 793) may be positioned lower than the axis grooves (see, e.g., the grooves 792 and 794) or, stated otherwise, the axis grooves may be positioned higher. Again, due to the intersection of two cylinders geometry, the axis grooves "see" the maximum radius of the outer race 310 as they are shown to be aligned along the longitudinal axis of the outer race 310 while the cross-axis grooves "see" radii that are less than the maximum of the outer race 310 as they are shown to be offset from the longitudinal axis of the outer race 310. As an example, a pin can include grooves that are designed for or over designed for axis or cross-axis positioning. As an example, a pin can include grooves that are limited in groove volume (e.g., individual or total) such that lubricant film dynamics are not detrimentally, undesirably altered (see, e.g., the lubricant film region 392, which is in fluid communication with the grooves 791, 792, 793 and 794).

As shown in FIG. 9A, the groove 793 can be facing upwardly and concave such that it can retain lubricant that is not amenable to drainage from the groove 793 due to gravity, where gravity is indicated to be in the direction shown in FIG. 9A. In such an example, the lubricant volume of the groove 793 may be designed accordingly. Further, the lubricant retained in the groove 793 may help to lubricate the interface between the pin 700 and the outer race 310 when the turbocharger assembly 200 is not operational; whereas, without the groove 793, direct contact may occur between an outer surface of a pin and a surface of an opening of an outer race, which may be detrimental for one or more reasons (e.g., sticking, coking of lubricant, etc.).

FIG. 10 shows a perspective view of a portion of the pin 700 and a portion of the bearing assembly 300. As shown in the example of FIG. 10, the outer race 310 includes a keyway 311, which is shown in FIG. 3 as being on a compressor side of the bearing assembly 300. Such a keyway may be utilized with a key as a mechanism to limit movement of the outer race 310, which may be additional to the use of the pin 700. As shown, the outer race 310 can include various features such as a recessed substantially annular region 312 disposed axially between lubricant wells 314 and 316 as separated from the annular region 312 by regions 315 and 316, respectively. As explained, when disposed in the bore 281 of the housing 280, the annular region 312 can define the lubricant film region 392, which can be in fluid communication with the grooves 751, 752, 753 and 754 of the pin 700. As explained, the grooves 752 and 754 extend deeper into the opening 370 of the outer race 310 than do the grooves 751 and 753; noting that groove dimensions, positions, etc., may be adjusted to provide for desired depth(s).

FIG. 11A shows the pin 700 as viewed from inside the outer race 310 where a portion of the end portion 780 and the end surface 790 are visible. In the example of FIG. 11A, the groves 751, 752, 753 and 754 are not visible as they do not extend to or past the opening 370 at the inner surface of the outer race 310.

FIG. 11B shows the pin 700 as viewed from inside the bore 281 of the housing 280 where the opening 580 in the bore wall 283 of the housing 280 is shown with the pin 700 extending in part therethrough such that the groove 754 (e.g., oriented toward the compressor side) is partially visible while another portion of the groove 754 defines a groove reservoir with respect to the lubricant well region 570, which is defined by a surface of the pin socket 501 in the housing 280.

In the example of FIG. 11B, the visible portion of the groove 754 may be referred to as a groove opening or groove reservoir opening that is in fluid communication with a groove reservoir as defined in part by another portion of the groove 754 and a surface of a pin socket 501. As mentioned, lubricant may flow to and/or from the lubricant film region 392 and one or more grooves of a pin to address one or more NVH issues.

Figure 12A:
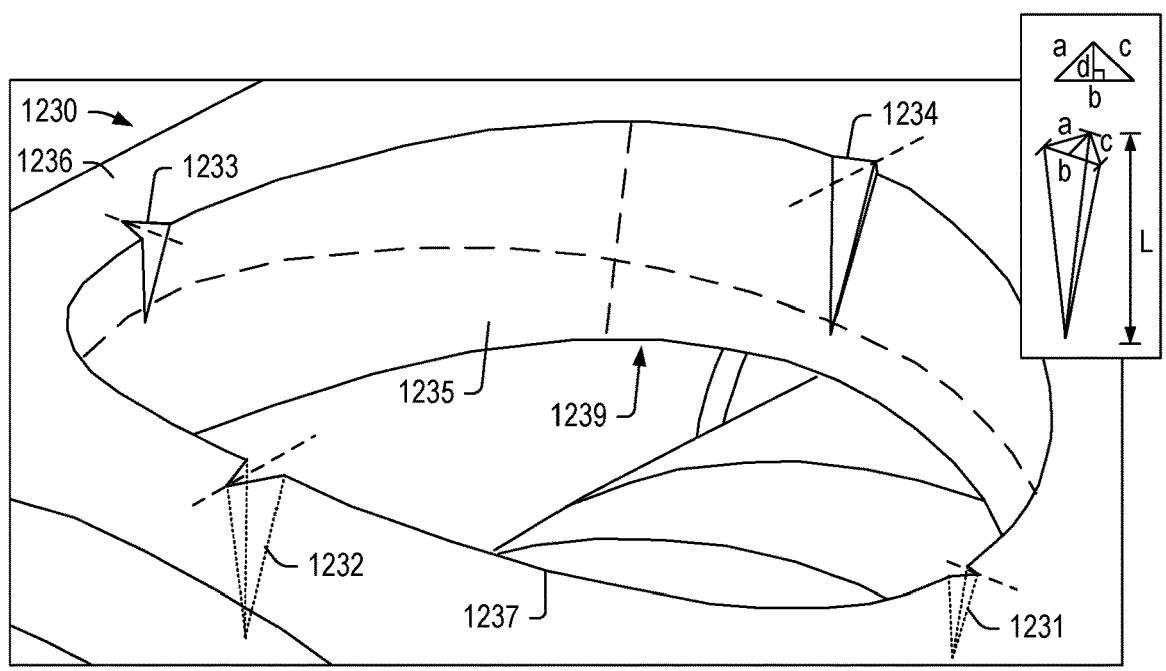
FIGS. 12A and 12B are a perspective view of an example of a portion of a bearing and a cross-sectional view of the example bearing with an example of a pin.

FIG. 12A shows an example of a portion of a bearing 1230, which may be a journal or an outer race of a rolling element bearing assembly (REB assembly). As shown, the bearing 1230 includes a wall 1235 (e.g., a pin opening surface) that forms a shoulder with respect to a surface 1236 (e.g., a cylindrical surface) and another shoulder with respect to an inner surface 1239 where the wall 1235 defines an opening 1237 (e.g., a cross-bore to a main bore of the bearing 1230, etc.), which can be dimensioned to receive a pin such as, for example, the pin 700 or, for example, a pin with fewer grooves, more grooves, no grooves, etc.

In the example of FIG. 12A, the wall 1235 can have a varying thickness as it is formed by an intersection of a cylinder with an annular cylinder. In such an example, the thickness can be greater "off-axis" when compared to "on-axis". As shown in the example of FIG. 12A, the bearing 1230 can include one or more grooves 1231, 1232, 1233 and 1234 in the wall 1235, which can be at one or more positions, including, for example, one or more off-axis positions and/or one or more on-axis positions. In the example of FIG. 12A, the grooves 1232 and 1234 are on-axis while the grooves 1231 and 1233 are off-axis. As shown, a groove may be defined by a length L, a depth d, an opening width b and side dimensions such as a and c.

In the example of FIG. 12A, each of the grooves may be approximated as a V-shaped groove, which can have, for example, a depth d that varies over the length L. For example, if L is measured from the surface 1236, then the depth d diminishes with length, along with the opening width b and the side dimensions a and c. As an example, the shape of a groove may depend on a tool or tools utilized to form the groove and/or a process or processes utilized to form the groove (see, e.g., FIG. 14A, FIG. 14C and FIG. 15).

As mentioned, forces, contact, NVH, etc., can be directional, which may be an on-axis direction, an off-axis direction or another direction. As explained, a groove can be positioned and/or dimensioned (e.g., sized, shaped, etc.) to address a particular issue. As to a bearing, it may be configured for orientation in a limited number of ways in a bore of a housing. For example, a bearing may be symmetric such that either end may be a compressor side end and either end may be a turbine side end. Alternatively, a bearing may be asymmetric in that it has a compressor side end that is to be on the compressor side of a bore of a housing and/or it has a turbine side end that is to be on the turbine side of a bore of a housing.

In the example of FIG. 12, the on-axis grooves 1232 and 1234 are shown to be larger than the off-axis grooves 1231 and 1233. Such an approach may match overlap with a pin that includes four equal sized grooves where due to the geometry of the opening 1237 the overlap is less for the off-axis grooves and more for the on-axis grooves.

As explained, a pin with one or more grooves may be oriented in a desired orientation using one or more guides, which may include a marker, an inspection tool, etc., such that a groove is oriented as desired (e.g., aligned with an on-axis, aligned with an off-axis, etc.). As to the bearing 1230, orientation may be simpler and, in many instances, assured (e.g., for an asymmetric bearing, etc.).

As mentioned, an assembly can include a pin with at least one groove and/or a bearing with at least one groove. In such an assembly, where a pin is grooved and a bearing is grooved, grooves may align or not.

Figure 12B:
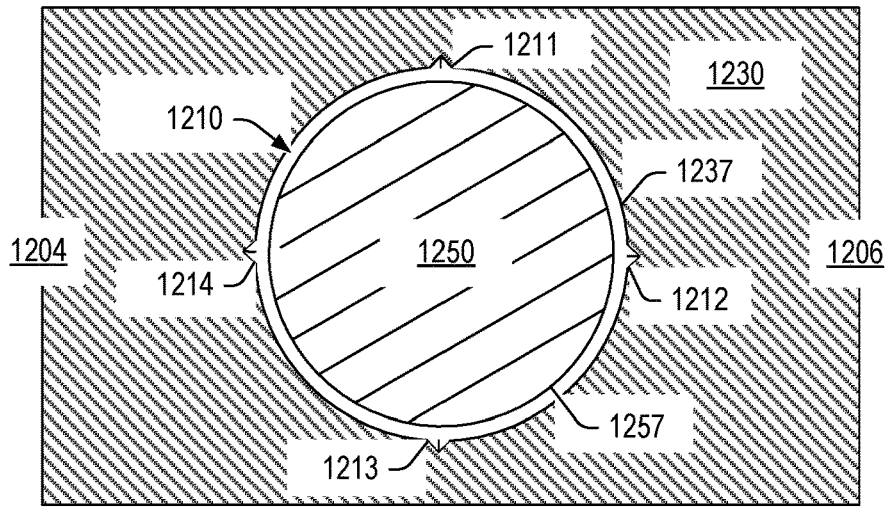

In the example of FIG. 12B, a clearance region 1210 is illustrated along with groove regions 1211, 1212, 1213 and 1214, which can receive lubricant (e.g., fill with lubricant). FIG. 12B also shows the opening 1237 of the bearing 1230 (e.g., as defined by the wall 1235 and the surface 1236) and an outer surface 1257 of a region 1250 of a pin, which does not include grooves (e.g., at least at the level shown in the cross-sectional view of FIG. 12B).

In the example of FIG. 12B, a turbine side 1206 is shown along with a compressor side 1204. In such an example, axial thrust can drive the bearing 1230 toward the compressor side 1204 or toward the turbine side 1206, where the dynamics of such axial thrust and its direction can differ. As explained, the bearing 1230 may rotate, either clockwise or counter-clockwise, where the dynamics can differ.

In the example of FIG. 12B, the regions 1212 and 1214 can provide for some amount of damping for axial thrust that causes at least translational movement of the bearing 1230 (e.g., along an axis directed from the compressor side 1204 to the turbine side 1206) while the regions 1211 and 1213 can provide for some amount of damping for rotation (e.g., clockwise or counter-clockwise about the axis directed from the compressor side 1204 to the turbine side 1206).

As mentioned, a pin and/or a bearing can include one or more grooves where each groove may correspond to a particular type or types of movement that may give rise to one or more NVH issues. While the example of FIG. 12B shows the regions 1211, 1212, 1213 and 1214 numbering four in total and being spaced at approximately 90 degrees about the opening 1237, where an issue is determined to be for one of the aforementioned four types of movements, a bearing may include a single groove or grooves arranged to address that one type of movement.

As explained, bearings of turbochargers can give rise to one or more types of NVH issues. For example, rolling elements rotating at or near a critical speed may tend to produce an objectionable whine especially under conditions when the engine noise is not loud enough to mask the turbocharger noise such as at idle. As explained, at idle, the engine may be at a particular low revolution speed as to a crankshaft operatively coupled to pistons. Further, depending on the configuration for lubricant pumping, lubricant pressure may be lower than at non-idle, higher engine RPMs.

Various types of NVH issue can be the most severe under cold start conditions when the engine and engine lubricant are both cold (e.g., at ambient temperature or otherwise much less than the operational temperature of the engine). As an example, a grooved pin and/or a grooved bearing can help to reduce or eliminate objectionable noise generated by a turbocharger under cold idle conditions.

Figure 13:
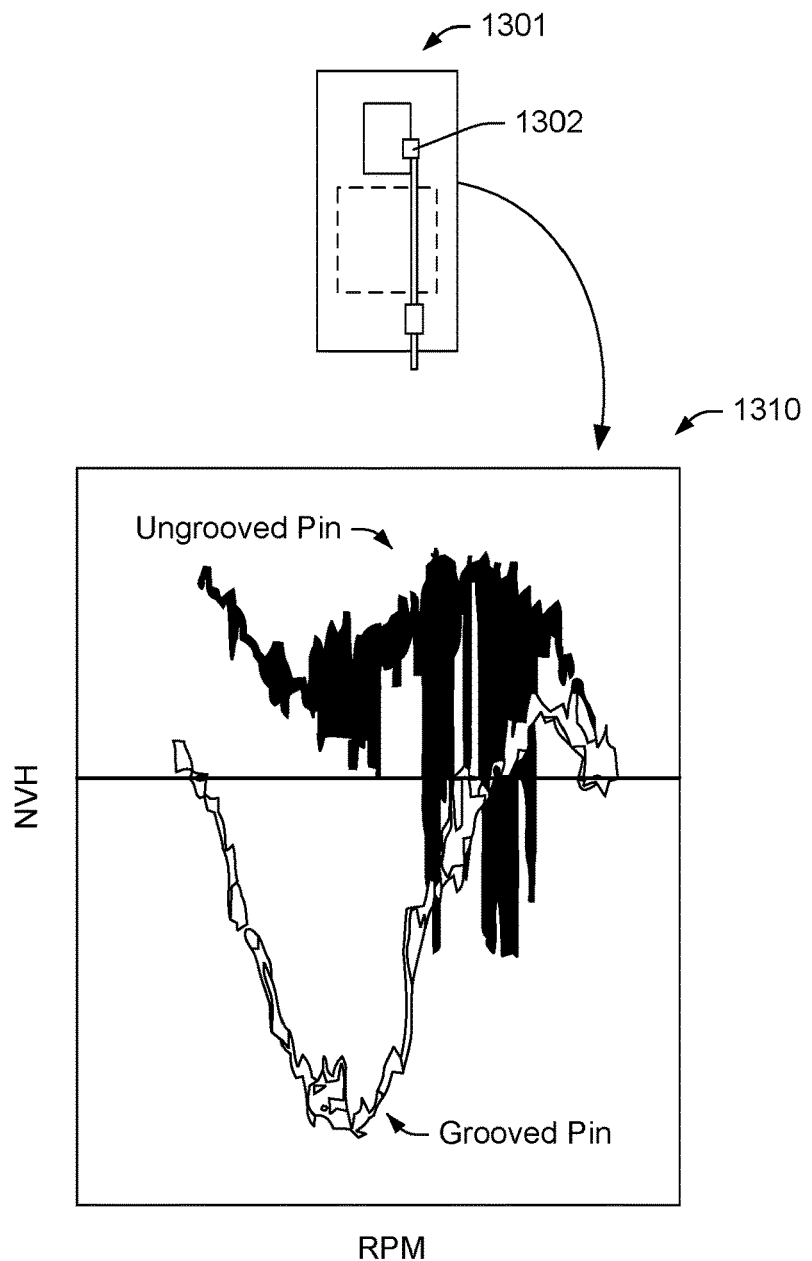
FIG. 13 is an example of a plot of vibration with respect to compressor speed.

FIG. 13 shows an example of a vehicle 1301 with a turbocharger 1302 that includes a turbocharger assembly such as, for example, the turbocharger assembly 200. In such an example, testing may be performed to characterize objectionable NVH, which may be plotted as energy or other parameter versus RPM, which may be engine RPM, turbocharger shaft RPM, etc. FIG. 13 shows an example plot 1310 of trial data for a turbocharged engine with and without a grooved pin (e.g., an ungrooved pin and a grooved pin). As shown, the characteristics of NVH can be altered using a grooved pin. In particular, rapid shifts in energy can be mitigated where such rapid shift can correspond to bearing/pin phenomena over a range of engine RPM, which may be or include, for example, engine idle RPM. In such an approach, rather than altering what may be otherwise an optimal engine idle RPM, a pin can be grooved or a grooved pin provided that mitigates undesirable NVH.

Figure 14A:
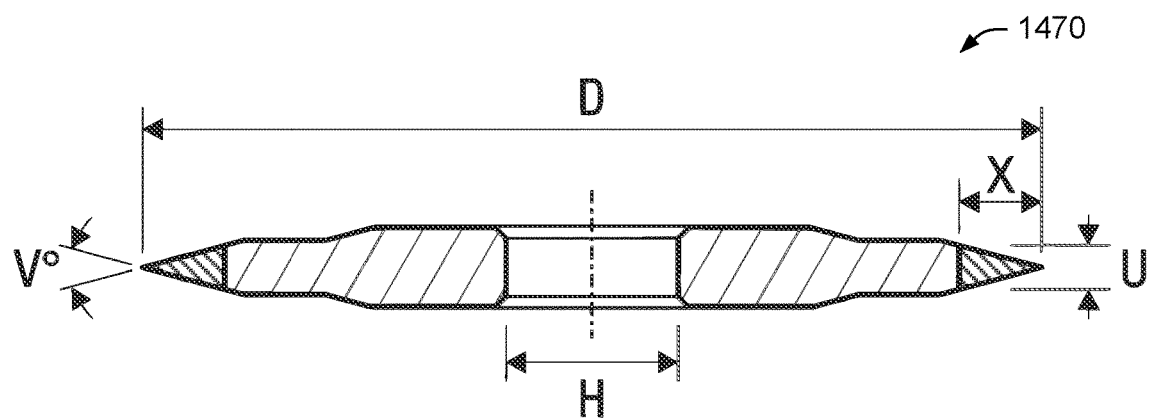
FIGS. 14A, 14B and 14C are views of an example of a grinding wheel and examples of manufacturing processes, respectively.
Figure 14B:
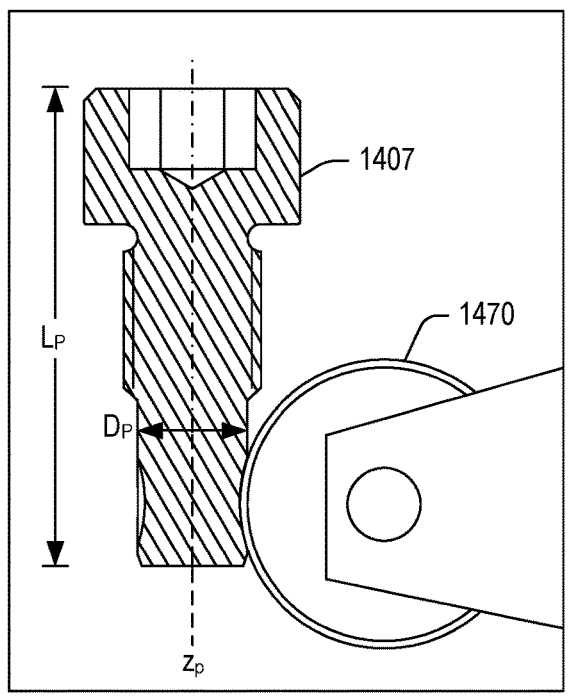

FIG. 14A shows an example of a grinding wheel 1470 that includes an end profile suitable for forming one or more grooves in a pin. FIG. 14B shows a cross-sectional view of an example of a pin 1407, which may be a stock or blank suitable for use without grooves whereby the grinding wheel 1470 can be utilized to form one or more grooves in the pin 1407 and FIG. 14C shows a cross-sectional view of an example of the bearing outer race 310, as including various features.

In FIG. 14A, various dimensions are shown, including a wheel diameter D, a hole diameter H, a profile length X, a profile width U, and a profile angle V°. Such dimensions can be parameters of a grinding wheel (e.g., a cutting wheel, etc.) or other tool that can be utilized to form a groove or grooves in a pin or in a bearing.

In FIG. 14B, various dimensions are shown, including a pin length $L_P$ in a direction along a pin axis $z_p$ and a pin diameter $D_P$ along a portion of the pin 1407 where one or more grooves can be formed. In the example of FIG. 14B, the grinding wheel 1470 is brought into contact with the pin 1407 in a plane that includes the pin axis $z_p$; noting that contact to form a groove may be with the plane of the grinding wheel 1470 offset from the pin axis $z_p$.

Figure 14C:
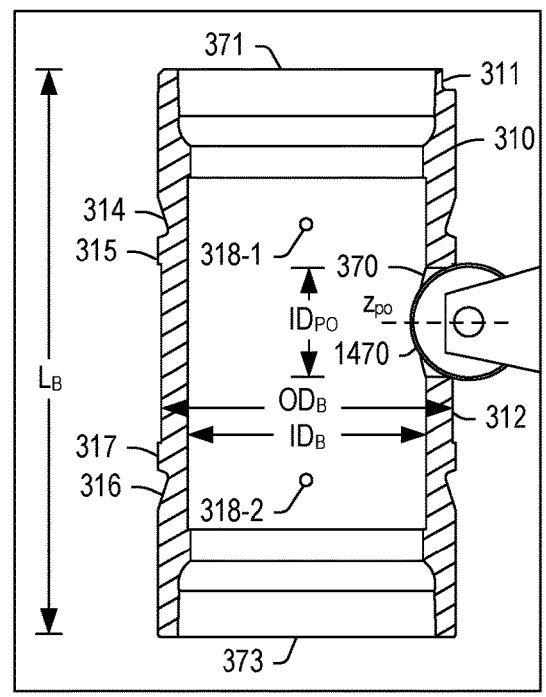

In the example of FIG. 14C, the features of the bearing 310 include a compressor side end 371, a turbine side end 373 along with lubricant jet openings 318-1 and 318-2, which align with the lubricant wells 314 and 316, respectively. Various dimensions are shown in FIG. 14C, including a pin opening axis $z_{p0}$, a bearing length $L_B$, a bearing outer diameter $OD_B$ at the lubricant film forming surface 312, which is adjacent to the pin opening 370, an a bearing inner diameter $ID_B$, which is at an axial portion of the bearing 310 that is within the span of the lubricant film forming surface 312 such that at the pin opening 370, the bearing 310 has thicknesses that may be defined in part by $OD_B$ from $ID_B$. For example, in the cross-sectional view of FIG. 14C, the thickness may be defined as an on-axis thickness by subtracting $OD_B$ from $ID_B$ and dividing the result by 2 (e.g., $(OD_B-ID_B)/2$); however, as mentioned, the wall of the pin opening 370 may not be constant due to geometry of intersecting cylinders where, for a given $OD_B$ and $ID_B$, the off-axis thickness is greater than the on-axis thickness. Where off-axis and on-axis grooves are formed in a bearing, groove length with respect to thickness of a wall that defines a pin opening may be taken into account, for example, to address short circuiting of lubricant flow (e.g., a groove that is not facing a pin surface and/or a groove that extends to $ID_B$). As an example, groove length along a wall that defines a pin opening may be varied in the axial direction (on-axis) and anti-rotational direction (off-axis), for example, to reach a certain fraction or percent of a bearing thickness and/or wall thickness, which may be to provide a groove that does not break through to an inner surface at $ID_B$. As an example, consider limiting groove length to 75 percent of a bearing thickness (e.g., $(OD_B-ID_B)/2$) and/or limiting groove length to 75 percent of a wall thickness of a wall that defines a pin opening. In such examples, the groove length limit may be lesser (e.g., yet sufficient to address one or more NVH issues) or may be greater, for example, to approximately 90 percent to provide greater interface coverage, though with some possible amount of increase in lubricant leakage from the interface to an axial, longitudinal bore of the bearing (e.g., where lubricant flow from a break-through groove would be lubricant short circuiting).

FIG. 14C also shows an example of the grinding wheel 1470 (e.g., as appropriately sized, shaped, aligned, etc.) as being inserted at least in part in the opening 370 to form one or more grooves. For example, consider aligning a plane of a grinding wheel on-axis to form one or two grooves (e.g., optionally two grooves simultaneously), aligning a plane of a grinding wheel off-axis to form one or two grooves (e.g., optionally two grooves simultaneously), and/or aligning a plane of a grinding wheel at a desired angle to form one or more grooves, etc.

As an example, the same grinding wheel may be suitably sized for forming pin grooves and for forming bearing grooves. As an example, different types, sizes, shaped tools, etc., may be utilized to form one or more grooves.

As an example, one or more grooves may be formed according to one or more specifications, which can include position, depth of cut, length of cut, width, etc. As an example, a depth of cut may be less than approximately 5 mm and may be less than approximately 2 mm. As an example, a method can include utilizing a roughing grinding wheel and then a finishing grinding wheel, which can be rated as to grit size, etc.

Figure 15:
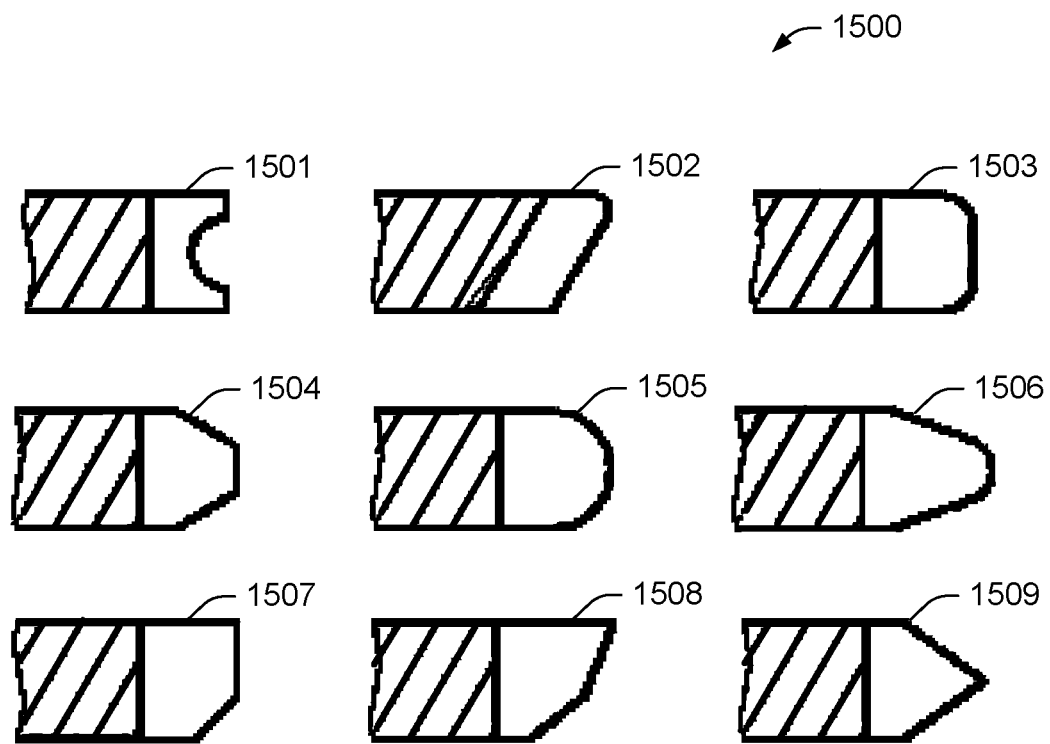
FIG. 15 is a series of views of examples of profiles.

FIG. 15 shows some examples of profiles 1500 that may be utilized for forming one or more grooves. As shown, a profile can be symmetric or asymmetric. A profile 1501 includes a central ridge with two valleys, a profile 1502 includes a deep valley offset from center, a profile 1503 include a flat valley bed with rounded walls, a profile 1504 includes a flat valley bed with slanted walls, a profile 1505 includes a semi-circular shape, a profile 1506 includes a somewhat parabolic shape, a profile 1507 includes a flat bed with a single slanted wall, a profile 1508 includes two slanted portions with a straight portion, and a profile 1509 includes a V-shape.

As to groove formation, groove or slot milling, keyslot milling, optionally followed by side milling, etc., may be utilized. As an example, a groove may be formed as a kerf using a cutting technique.

As an example, a groove can be of one or more profiles such as, for example, one or more of ellipsoidal, lenticular, polygonal (e.g., triangular, rectangular, etc.), circular, etc.

As an example, a groove can have a lenticular shaped opening, which may be represented on a curved surface such as the surface of a cylindrically shaped pin portion.

As an example, a groove can be volumetric. As an example, a groove can be defined by a surface such as, for example, a surface of a portion of a volumetric geometric body. For example, consider a spheroid, which may be prolate or oblate. As another example, consider a paraboloid. As an example, a volume of a groove may be represented by a portion of a lenticular body of rotation, where a lenticular shape may be defined by the intersection of two arcs (e.g., two circles, two ellipses, etc.).

As to a prolate spheroid, it can be a spheroid that is "pointy" instead of "squashed," i.e., one for which the polar radius c is greater than the equatorial radius a, so c>a (e.g., a spindle-shaped ellipsoid). A symmetrical egg can include the same shape at both ends and can approximate a prolate spheroid. A prolate spheroid is a surface of revolution obtained by rotating an ellipse about its major axis and has Cartesian equations:

$$\frac{x^2+y^2}{a^2}+\frac{z^2}{c^2}=1$$

As an example, a portion of a capsule shape can be formed where a capsule is a stadium of revolution that is a cylinder with two hemispherical caps on either end. As an example, a portion of a prolate spheroid with one or two conical ends may be formed.

As explained, a groove can be provided in a pin and/or a bearing where the groove extends an axial length with respect to a longitudinal axis of the pin (e.g., or an axis of an opening of a bearing, etc.). As an example, one or more grooves may be defined using a cylindrical coordinate system with a z-axis along a longitudinal axis of the pin. As an example, a groove can be defined in a separate coordinate system that can be for a corresponding shape (e.g., a geometric shape, etc.) that can be overlaid or intersected with a cylindrical coordinate system. For example, consider a lenticular body of revolution defined with respect to an axis of revolution where the lenticular body of revolution can be positioned with respect to a surface of a pin and/or a surface of a bearing represented in a cylindrical coordinate system such that a portion of the pin and/or a portion of the bearing can become a groove represented in part by a portion of the lenticular body of revolution.

As explained, an anti-rotation pin and an opening in a bearing can provide for various functions in a turbocharger. For example, consider positioning of a rotor group axially within a bore of a center housing, where the pin can transmit thrust load of a rotor group from the bearing (e.g., an outer race or journal) to a center housing, and where the pin can limit (e.g., resist) some amount of rotation of the bearing (e.g., an outer race or a journal). An undesirable function of an anti-rotation pin disposed at least in part in an opening of a bearing can be providing a transmission path for noise and vibration from a rotor group to a center housing.

In various types of turbochargers, during operation, an anti-rotation pin disposed at least in part in an opening of a bearing may be the only metal-to-metal connection between a rotor group and a center housing. As explained, during operation (e.g., sufficient lubricant pressure, etc.), an outer race can be supported in a bore of a center housing by a thin film of lubricant, which can be a squeeze film damper (SFD).

As explained, a pin and/or a bearing can be provided with one or more grooves that can be in fluid communication with a SFD such that the one or more grooves can receive lubricant. For example, consider a pin where axial groove features are added proximate to an end of the pin where some lubricant that is present in between the center housing and an outer race flows in the axial groove features to an interface area between the pin and the pin hole in the outer race (see, e.g., the opening 370 of the outer race 310). In such an example, the presence of lubricant at this interface promotes a film of lubricant to form between the pin and the outer race that creates a damping element to reduce the vibration transmissibility from the outer race to the pin. As to a bearing, consider the bearing 1230 of FIGS. 12A and 12B where the surface 1236 can be a surface that can form a lubricant film region with respect to a surface of a bore of a housing. As shown, the opening 1237 is in the surface 1236 such that lubricant can flow into one or more of the grooves 1231, 1232, 1233 and 1234, for example, as shown via the regions 1211, 1212, 1213 and 1214 of FIG. 12B.

As explained, a groove feature (e.g., a groove) can be formed via one or more processes, which may include rolling and/or machining, which may be performed, for example, after turning. As explained, a process can involve removing material from a pin (see, e.g., FIG. 14B) and/or removing material from a bearing (see, e.g., FIG. 14C).

As to groove(s) position and/or length, these may be selected such that some amount of overlap occurs in a gap that exists between a bore wall of a center housing and an outer race where the groove(s) can extend axially into the interface between the outer race and the pin.

Referring again to FIGS. 11A and 11B, a groove can be configured and a pin positioned such that the groove does not extend axially past the inner diameter of the outer race (see, e.g., FIG. 11A). Where additional flow of lubricant inwardly to a space defined by the inner diameter of the outer race is desired, a groove may extend past the inner diameter of the outer race; however, such an arrangement may aim to limit short circuiting of lubricant into a bearing assembly whereby lubricant flow via lubricant jets of the outer race are diminished to an extent that lubricant provided to rolling elements is insufficient. Where risk of short circuiting is to be eliminated, the ends of one or more grooves of a pin, in an assembled turbocharger assembly, can be short of an inner surface of an outer race (e.g., or journal) such that lubricant in a lubricant film region (see, e.g., the lubricant film region 392) does not flow excessively through the one or more grooves and into a bearing assembly (e.g., an REB assembly).

As shown in the example of FIG. 12A, the grooves 1231, 1232, 1233 and 1234 do not extend to an inner surface 1239 of the bearing 1230, which can help to reduce risk of short circuiting of lubricant, where it is desirable to reduce such risk. As explained, the wall 1235 can extend from the surface 1236 to the surface 1239 and may be part of a cross-bore (e.g., cylinders with intersecting axes, etc.). Given the geometry, where a length of a groove on-axis is utilized for a groove off-axis, as the wall 1235 can be thicker off-axis, the length may be assured to not be long enough for short circuiting, depending on the extent to which a pin extends into the opening 1237 and overlaps the wall 1235.

As to parameters such as width of a groove, number of grooves, orientation of a groove or grooves, etc., these may be selected so as to preserve sufficient surface for contact between a pin and a surface of an outer race that defines an opening for the pin. For example, groove depth may be utilized for volume increase rather than groove width such that contact surface is sufficient. As contact surface decreases, the force experienced by particular surface regions of a pin can increase, which may cause some amount of wear to a pin, for example, at an edge of a groove. Where groove width is limited, contact may be more even such that edges of a groove are sufficiently close to experience a common level of force (e.g., stress, etc.). Where groove width is too wide, one edge may experience a level of force that differs from another edge, which may lead to higher force per unit area of one edge and a greater amount of wear.

As an example, a pin and/or a pin socket can include chamfers (bevels) that can forms a guide(s) for positioning and/or interference fitting, which may help to distribute force(s) more evenly around a circumference of an opening, which may allow compression to more occur gradually such that a pressing operation may be smoother, more easily controlled, etc. As an example, a shoulder about an opening of a bearing may include a chamfer or chamfers, which may provide for filling of lubricant that may flow to one or more grooves in a wall of the bearing that defines the opening.

As to thermal control, various materials expand when heated and shrink when cooled. As such, a pin may be cooled (e.g., and/or a housing may be heated depending on material, stress, etc.). As an example, a thermal control process may include heating and/or cooling of one or more components where at ambient temperature (e.g., and at operational temperatures of a turbocharger) compression results from thermal equilibrium of a pin in a pin socket. Such a process may be a shrink-fitting processor. As an example, a pin may be cooled using one or more agents (e.g., carbon dioxide at approximately −78.5 degrees C., liquid nitrogen at approximately −196 degrees C., etc.). In a sub-ambient temperature state (e.g., below approximately 20 degrees C.), where a housing with a pin socket may be at least at an ambient temperature, a cooled pin may be positioned in the pin socket such that contact surfaces of the cooled pin and the pin socket contact each other to limit axial movement. In such a state, the pin and the housing may be held in such a position until the temperature of the pin rises such that the pin expands in diameter to create an interference fit.

As an example, a thermal process that involves cooling a pin may be more effective as to longevity of a turbocharger as heating for thermal expansion (e.g., above ambient temperature) may introduce one or more types of changes to material properties (e.g., tempering, etc.), may introduce undesirable stresses, etc.

As an example, a pin that is interference fit via a thermal process may be scar-less in that a contact surface of the pin does not translate or rotate against a contact surface of a pin socket in a manner that would scar the contact surface of the pin. In such an approach, one or more surfaces of a pin may be without scratches, etc., which may mean that debris is avoided, that a bearing with an aperture is located by a smoother portion of a pin in comparison to a scarred portion.

As an example, a pin may be made of a low alloy steel. As an example, a center housing may be made of cast iron (e.g., grey cast iron). As an example, a pin can be a machined component (e.g., formed from a stock cylinder of low alloy steel, etc.). As an example, a pin socket of a center housing can be formed via machining a cast center housing.

As an example, a pin can include an end socket, which may be of an M configuration (e.g., M4, etc.). As an example, where machining equipment for a center housing includes a tool or tools for threaded pin sockets, such a tool or tools may be sized according to the "M" configurations, which specify drill sizes. For example, consider a machining process for an M8×1 threaded socket that uses a 7 mm drill size. In such an example, a 7 mm diameter socket may be formed with a desired axial length where the 7 mm diameter socket may be tapped for forming threads or may be not tapped (non-tapped) such that it is threadless. Where a socket includes a 7 mm diameter portion, a pin can include a smaller diameter portion that steps to a larger diameter portion where the larger diameter portion has a diameter that exceeds 7 mm by approximately 0.005 mm to approximately 0.1 mm (e.g., 7+ mm) for purposes of forming an interference fit upon contact of at least a portion of the 7 mm diameter portion of the socket of the housing and at least a portion of the 7+ mm diameter portion of the pin. As an example, a diameter of a portion of a pin can be approximately 0.015 mm to approximately 0.05 mm larger than a portion of a pin socket or, for example, approximately 0.02 mm to approximately 0.04 mm larger than a portion of a pin socket for purposes of forming an interference fit.

Table 1, below, shows some example dimensions for "M" configurations.

| Tap size | Major d (mm) | Major d (inch) | mm/ thread | Drill size |
| --- | --- | --- | --- | --- |
| M3 × 0.5 | 3 mm | 0.1181 | 0.5 | 2.5 mm |
| M3.5 × 0.6 | 3.5 mm | 0.1378 | 0.6 | 2.9 mm |
| M4 × 0.7 | 4 mm | 0.1575 | 0.7 | 3.3 mm |
| M5 × 0.8 | 5 mm | 0.1969 | 0.8 | 4.2 mm |
| M6 × 1 | 6 mm | 0.2362 | 1 | 5 mm |
| M8 × 1.25 | 8 mm | 0.315 | 1.25 | 6.8 mm |
| M8 × 1 | 8 mm | 0.315 | 1 | 7 mm |
| M10 × 1.5 | 10 mm | 0.3937 | 1.5 | 8.5 mm |
| M10 × 1.25 | 10 mm | 0.3937 | 1.25 | 8.8 mm |
| M12 × 1.75 | 12 mm | 0.4724 | 1.75 | 10.2 mm |
| M12 × 1.25 | 12 mm | 0.4724 | 1.25 | 10.8 mm |

As an example, a turbocharger assembly can include a housing that includes a bore defined by a bore wall and a pin socket that forms an opening in the bore wall; a bearing that includes a pin opening defined by a pin opening surface; a pin, where the pin includes a longitudinal pin axis and a pin surface; a groove in the pin opening surface or the pin surface, where the groove has an axial length; where, in a positioned state of bearing in the bore and the pin in the pin socket with part of the pin in the pin opening, a clearance exists between the bearing and the bore wall, where the groove is in fluid communication with the clearance to form a supply path for lubricant from the clearance to an interface between the pin surface and the pin opening surface.

As an example, a groove can be in a pin surface where an axial length of the groove overlaps at least a portion of a bearing-bore wall clearance and at least a portion of a pin opening surface in a bearing to form the supply path for lubricant from the clearance to an interface between the pin surface and the pin opening surface.

As an example, a bearing can be a rolling element bearing assembly (e.g., a REB assembly).

As an example, a bearing can include an outer race where a pin opening surface is a surface of the outer race (e.g., a wall surface that defines the pin opening, which can be, for example, a cross-bore that intersects a longitudinal bore of the outer race).

As an example, a bearing can be a journal bearing. A journal bearing can be a unitary component that is a unitary piece of material. A journal bearing can include one or more journal surfaces along a bore wall that form one or more corresponding lubricant film regions with respect to a rotatable shaft with one or more journal surfaces where the rotatable shaft is rotatably supported by the journal bearing in a housing (e.g., a center housing).

As an example, a bearing can be located using a pin disposed at least in part in a pin opening of the bearing where the pin may act to limit axial and/or rotational movements of the bearing while, for example, allowing for some amount of movement in a radial direction (e.g., a direction along a pin axis). Movement in a radial direction can provide for some changes in lubricant film thickness between an outer surface of the bearing and an inner surface of a bore of a housing.

As an example, a clearance between a bearing and a bore wall of a housing can define one or more lubricant film regions. For example, consider a lubricant film region that is adjacent to a pin opening of a bearing. As an example, a lubricant film region can be or can include a squeeze film damper region (e.g., that operates as a squeeze film damper (SFD)).

As an example, a pin surface of a pin can include a plurality of grooves and/or a pin opening surface of a bearing can include a plurality of grooves. As an example, a groove can be a groove in a pin surface and another groove can be a groove in a pin opening surface.

As an example, a turbocharge assembly, in a positioned state of a pin in a pin opening of a bearing, a groove can be aligned with a longitudinal axis of a bore of the housing that receives at least a portion of the bearing. In such an example, in the positioned state, the bearing can be translatable in a direction along the longitudinal axis to form a contact between the pin surface and the pin opening surface. As an example, in the positioned state, a groove may be oriented orthogonally to a longitudinal axis of the bore of the housing. In such an example, in the positioned state, a bearing can be rotatable clockwise or counter-clockwise to form a contact between the pin surface and the pin opening surface.

As an example, a groove can include a V-shaped profile in a plane, where a longitudinal pin axis of a pin (e.g., as received or receivable in a pin opening of a bearing) is normal to the plane. As an example, a pin surface of a pin can include a groove with a V-shaped profile and/or a pin opening surface of a pin opening of a bearing can include a groove with a V-shaped profile. As an example, where grooves exist in a pin surface and in a pin opening surface, groove profiles may differ or may be similar; noting that a pin groove can be from an outer cylindrical surface of a pin directed radially inward (into the pin) and a pin opening groove can be from a cylindrical surface of a bearing directed radially outward (into the bearing).

As an example, a groove can be a pin surface groove where a portion of an axial length of the groove overlaps with a pin socket of a housing (e.g., a center housing). As an example, a pin socket of a housing can be a cross-bore that intersects a through bore of the housing to form an opening a wall of the through bore of the housing where a pin can extend from the opening a distance into the through bore, for example, a distance sufficient for a portion of the pin to be received in a pin opening of a bearing disposed at least in part in the through bore of the housing.

As an example, a pin surface can include metal and a pin opening surface of a bearing can include metal. In such an example, in an operational state of the turbocharger assembly, the supply path for lubricant from the clearance to the interface between the pin surface and the pin opening surface supplies lubricant that damps energy at the interface generated by movement of the bearing.

As an example, a turbocharger assembly can include at least four grooves that are in fluid communication with an interface between a pin and a bearing (e.g., an interface defined by a pin surface and a pin opening surface) where movement of the bearing includes at least one of rotational movement and axial movement and where the pin limits such movement (e.g., to an amount less than approximately 10 degrees, to an amount less than approximately 5 mm, etc.).

As an example, a groove can be a pin surface groove of a pin where the pin includes a head portion that includes a marker for orientation of the groove in the bore of the housing. In such an example, the groove may be desirably aligned to address one or more issues such as one or more NVH issues. For example, where a turbocharger assembly is found to exhibit one or more NVH issues during operation, a pin may be oriented (e.g., rotated, etc.) to orient a groove where the groove can provide lubricant at an interface defined at least in part by a surface of the pin. Such an approach may address a particular NVH issue that arises at a particular operational condition (e.g., rotational speed of a turbocharger shaft, rotational speed of an internal combustion engine, etc.). As an example, a pin may include a plurality of grooves where the pin may be oriented in a manner that helps to mitigate one or more NVH issues. As explained, a marker can facilitate alignment and/or knowing what alignment helps to mitigate one or more NVH issues.

As an example, a groove can be a pin surface groove of a pin, where the pin includes an end surface and where the groove does not extend to the end surface.

As an example, a groove can be a pin surface groove of a pin, where a pin socket of a housing includes a mating region, where the pin includes a mating region to secure the pin in the pin socket with respect to the mating region of the pin socket, and where the groove is disposed in a region of the pin between the mating region and the end surface.

As an example, a method can include during operation of a turbocharger, flowing lubricant to a lubricant film region between a bearing and a bore wall of a housing, where a pin extends from an opening in the bore wall into a pin opening defined by a pin opening surface of the bearing, and where a groove exists at an interface between a pin surface of the pin and the pin opening surface of the bearing; and flowing at least a portion of the lubricant from the lubricant film region to the interface between the pin opening surface and the pin surface via the groove. Such a method can help to mitigate one or more issues such as, for example, one or more NVH issues that may occur during operation of the turbocharger assembly. As an example, in the foregoing example method, the at least a portion of the lubricant, at the interface, can damp energy generated by movement of the bearing. For example, a method can include damping energy generated by moving a bearing where moving the bearing occurs while operating an internal combustion engine and flowing exhaust to a turbocharger that includes the bearing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger assembly comprising:
   a housing that comprises a bore defined by a bore wall and a pin socket that forms an opening in the bore wall;
   a bearing that comprises a pin opening defined by a pin opening surface;
   a pin, wherein the pin comprises a longitudinal pin axis and a pin surface; and
   a groove in the pin opening surface or the pin surface, wherein the groove comprises an axial length;
   wherein, in a positioned state of bearing in the bore and the pin in the pin socket with part of the pin in the pin opening, a clearance exists between the bearing and the bore wall, wherein the groove is in fluid communication with the clearance to form a supply path for lubricant from the clearance to an interface between the pin surface and the pin opening surface, and
   wherein, in an operational state of the turbocharger assembly, the supply path for lubricant from the clearance to the interface between the pin surface and the pin opening surface supplies lubricant that damps energy at the interface generated by movement of the bearing.

2. The turbocharger assembly of claim 1, wherein the groove is in the pin surface.

3. The turbocharger assembly of claim 1, wherein the bearing comprises a rolling element bearing assembly.

4. The turbocharger assembly of claim 1, wherein the bearing comprises an outer race wherein the pin opening surface is a surface of the outer race.

5. The turbocharger assembly of claim 1, wherein the bearing is a journal bearing.

6. The turbocharger assembly of claim 1, wherein the clearance defines a lubricant film region.

7. The turbocharger assembly of claim 6, wherein the lubricant film region comprises a squeeze film damper region.

8. The turbocharger assembly of claim 1, wherein the pin surface comprises a plurality of grooves.

9. The turbocharger assembly of claim 1, wherein the pin opening surface comprises a plurality of grooves.

10. The turbocharger assembly of claim 1, wherein the groove is a groove in the pin surface and further comprising another groove in the pin opening surface.

11. The turbocharge assembly of claim 1, wherein, in the positioned state, the groove is aligned with a longitudinal axis of the bore of the housing.

12. The turbocharger assembly of claim 1, wherein, in the positioned state, the bearing is translatable to form a contact between the pin surface and the pin opening surface.

13. The turbocharger assembly of claim 1, wherein, in the positioned state, the groove is oriented orthogonally to a longitudinal axis of the bore of the housing.

14. The turbocharger assembly of claim 1, wherein, in the positioned state, the bearing is rotatable clockwise or counter-clockwise to form a contact between the pin surface and the pin opening surface.

15. The turbocharger assembly of claim 1, comprising at least four grooves wherein movement of the bearing comprises at least one of rotational movement and axial movement.

16. The turbocharger assembly of claim 1, wherein the groove is a pin surface groove and wherein the pin comprises a head portion that comprises a marker for orientation of the groove in the bore of the housing.

17. The turbocharger assembly of claim 1, wherein the groove is a pin surface groove, wherein the pin comprises an end surface and wherein the groove does not extend to the end surface.

18. A method comprising:

during operation of a turbocharger, flowing lubricant to a lubricant film region between a bearing and a bore wall of a housing, wherein a pin extends from an opening in the bore wall into a pin opening defined by a pin opening surface of the bearing, and wherein a groove exists at an interface between a pin surface of the pin and the pin opening surface of the bearing; and flowing at least a portion of the lubricant from the lubricant film region to the interface between the pin opening surface and the pin surface via the groove.

19. The method of claim 18, wherein the at least a portion of the lubricant, at the interface, damps energy generated by movement of the bearing.

20. A turbocharger assembly comprising:

a housing that comprises a bore defined by a bore wall and a pin socket that forms an opening in the bore wall;

a bearing that comprises a pin opening defined by a pin opening surface;

a pin, wherein the pin comprises a longitudinal pin axis and a pin surface; and a groove in the pin surface, wherein the groove comprises an axial length;

wherein, in a positioned state of bearing in the bore and the pin in the pin socket with part of the pin in the pin opening, a clearance exists between the bearing and the bore wall, wherein the groove is in fluid communication with the clearance to form a supply path for lubricant from the clearance to an interface between the pin surface and the pin opening surface, and wherein the axial length of the groove overlaps at least a portion of the clearance and at least a portion of the pin opening surface to form the supply path for lubricant from the clearance to the interface between the pin surface and the pin opening surface.

* * * * *